United States Patent
Mizuno

(10) Patent No.: US 8,065,271 B2
(45) Date of Patent: Nov. 22, 2011

(54) STORAGE SYSTEM AND METHOD FOR BACKING UP DATA

(75) Inventor: Yoichi Mizuno, Yokohama (JP)

(73) Assignees: Hitachi, Ltd., Tokyo (JP); Hitachi Computer Peripherals Co., Ltd., Kanagawa-ken (JP)

( * ) Notice: Subject to any disclaimer, the term of this patent is extended or adjusted under 35 U.S.C. 154(b) by 565 days.

(21) Appl. No.: 12/020,801

(22) Filed: Jan. 28, 2008

(65) Prior Publication Data

US 2009/0043829 A1 Feb. 12, 2009

(30) Foreign Application Priority Data

Aug. 9, 2007 (JP) ................................ 2007-207742

(51) Int. Cl.
 G06F 17/30 (2006.01)
 G06F 7/00 (2006.01)
(52) U.S. Cl. ...................................... 707/640; 707/661
(58) Field of Classification Search .................. None
See application file for complete search history.

(56) References Cited

U.S. PATENT DOCUMENTS

| | | | | |
|---|---|---|---|---|
| 2003/0070043 | A1* | 4/2003 | Merkey | 711/114 |
| 2003/0088592 | A1* | 5/2003 | Innan et al. | 707/204 |
| 2006/0123207 | A1 | 6/2006 | Yamamoto et al. | |

FOREIGN PATENT DOCUMENTS

| | | |
|---|---|---|
| JP | 2003-140981 | 5/2003 |
| JP | 2006-163454 | 6/2006 |

* cited by examiner

*Primary Examiner* — Jay Morrison
*Assistant Examiner* — Sangwoo Ahn
(74) *Attorney, Agent, or Firm* — Brundidge & Stanger, P.C.

(57) ABSTRACT

To realize backup that gives no influence on on-line performance at low cost, provided is a storage system including one or more disk storage devices, a tape storage device, and a controller for controlling the at least one disk storage device and the tape storage device. The controller stores a copy of data stored in a first volume in a third volume, reads the copy of the data stored in the first volume from the third volume to store the copy in a first tape storage medium of the tape storage device, stores a copy of data stored in a second volume in the third volume, and reads the copy of the data stored in the second volume from the third volume to store the copy in a second tape storage medium of the tape storage device.

18 Claims, 14 Drawing Sheets

CTG MANAGEMENT TABLE

| CTG-ID | LUN |
|---|---|
| 0 | 0,1 |
| 1 | 2,3 |
| 2 | 4,5 |
| 3 | 6,7,8 |
| ⋮ | ⋮ |

*FIG. 6*

COPY VolG MANAGEMENT TABLE

| COPY VolG-ID | LUN |
|---|---|
| 0 | 10,11 |
| 1 | 12,13,14 |
| ⋮ | ⋮ |

*FIG. 7*

COPY GROUP MANAGEMENT TABLE

| COPY G-ID | COPY VolG-ID | CTG-ID | TG-ID | PRIMARY Vol BM-ID | SECONDARY Vol BM-ID | TAPE COPY BM-ID |
|---|---|---|---|---|---|---|
| 0 | 0 | 0 | 10,11,12,13,14 | 0,1 | 10,11 | 20,21 |
|   |   | 1 | 15,16,17,18,19 | 2,3 | 12,13 | 22,23 |
| 1 | 1 | 2 | 20,21,22,23,24 | 4,5 | 14,15 | 24,25 |
|   |   | 3 | 30,31,32 | 6,7,8 | 16,17,18 | 26,27,28 |
| ⋮ | ⋮ | ⋮ | ⋮ |   |   |   |

*FIG. 8*

STATUS MANAGEMENT TABLE

| COPY G-ID | COPY VolG-ID | Current CTG-ID | Current TG-ID | STATUS |
|---|---|---|---|---|
| 0 | 0 | 0 | - | PAIR |
| 1 | 1 | 3 | 30 | TAPE COPY |
| ⋮ | ⋮ | ⋮ | ⋮ | ⋮ |

*FIG. 9*

DISK MANAGEMENT TABLE

| LOGICAL VOLUME ID (11811) | INTERNAL LUN (11812) | LU SIZE (11813) | PHYSICAL DISK ADDRESS (11814) |
|---|---|---|---|
| 0 | 00 | 1TB | a:0-2000, b:0-2000, ⋮ n:0-2000 |
| 1 | 01 | 500GB | a:2001-3000, b:2001-3000, ⋮ n:2001-3000 |
| ⋮ | ⋮ | ⋮ | ⋮ |

TAPE MANAGEMENT TABLE

| TG-ID (11911) | Tape-ID (11912) | Keyword (11913) | ... |
|---|---|---|---|
| 10 | 1000,1001,1002 | ABCDEF | ... |
| 11 | — | — | ... |
| 12 | — | — | ... |
| ⋮ | ⋮ | ⋮ | |

STORAGE SYSTEM AND METHOD FOR BACKING UP DATA

CLAIM OF PRIORITY

The present application claims priority from Japanese application JP2007-207742 filed on Aug. 9, 2007, the content of which is hereby incorporated by reference into this application.

BACKGROUND

A technology disclosed herein relates to a management method for a storage system, and more particularly to a data backup method in a tape library.

There has been a tendency of increasing amount of data processed by a computer system of a company or the like, which has been accompanied by an increasing amount of backup data used to prevent a data loss caused by a failure or the like.

To store a large amount of data at low cost, a tiered storage system is generally used. In the tiered storage system, frequently accessed data is stored in a relatively expensive but high-performance storage medium such as a magnetic disk. On the other hand, infrequently accessed data such as backup data is stored in a relatively inexpensive storage medium such as a magnetic tape.

The process of copying the data stored in the magnetic disk in the magnetic tape to back up the data may affect performance of the magnetic disk device which is a copy source. As a result, performance of another process using the magnetic disk device which is the copy source (e.g., an application process of accessing data in the magnetic disk device) may deteriorate. To prevent such an influence on the performance, a technology which combines data copying between the magnetic disk devices with data copying from the magnetic disk device to a magnetic tape device has been disclosed (JP 2003-140981 A).

According to the technology disclosed therein, two volumes set in the magnetic disk device are mirrored. In other words, when data of one volume (primary volume) is updated, the updated data is copied to the other volume (secondary volume). As a result, the same data is stored in the two volumes. When the data of these volumes is backed up in a magnetic tape, the copying between the two volumes is stopped. While the data of the secondary volume is copied in the magnetic tape, the primary volume permits access from an application. Thus, the data can be backed up without affecting processing performance of the application.

Additionally, a storage system that includes a disk interface for a host computer and a function of storing data of a logical volume in a magnetic tape has been disclosed (JP 2006-163454 A). According to this storage system, management costs can be reduced by managing storage areas of a magnetic disk device and a magnetic tape device as logical volumes.

SUMMARY

To realize the technology disclosed in JP 2003-140981 A, the number of secondary volumes equal to that of primary volumes has to be prepared. At least a storage capacity equal to that allocated to the primary volume has to be allocated to the secondary volume. This has increased a capacity of the magnetic disk device mounted in the storage system, thereby causing a problem of a cost increase.

According to a representative invention disclosed in this application, there is provided a storage system, comprising: one or more disk storage devices; a tape storage device; and a controller for controlling the one or more disk storage devices and the tape storage device, wherein: the controller includes a first interface coupled to a network, one or more second interfaces coupled to the one or more disk storage devices and the tape storage device, a processor coupled to the first interface and the one or more second interfaces, and a memory coupled to the processor; the tape storage device includes a plurality of tape storage media for storing data; the plurality of tape storage media include a first tape storage medium and a second tape storage medium; and the controller is configured to: divide a storage area of the one or more disk storage devices for storing data into a plurality of volumes including a first volume, a second volume, and a third volume; store a copy of data stored in the first volume in the third volume; read the copy of the data stored in the first volume from the third volume to store the copy in the first tape storage medium of the tape storage device; store a copy of data stored in the second volume in the third volume; and read the copy of the data stored in the second volume from the third volume to store the copy in the second tape storage medium of the tape storage device.

According to an embodiment of this invention, data backing-up which does not affect processing performance of the application can be realized at low cost.

BRIEF DESCRIPTION OF THE DRAWINGS

FIG. 6 is an explanatory diagram of a CTG management table according to the first embodiment of this invention.

FIG. 7 is an explanatory diagram of a copy Vol G management table according to the first embodiment of this invention.

FIG. 8 is an explanatory diagram of a copy group management table according to the first embodiment of this invention.

FIG. 9 is an explanatory diagram of a status management table according to the first embodiment of this invention.

FIG. 10 is an explanatory diagram of a disk management table according to the first embodiment of this invention.

FIG. 11 is an explanatory diagram of a tape management table according to the first embodiment of this invention.

DETAILED DESCRIPTION OF THE PREFERRED EMBODIMENTS

Figure 1:
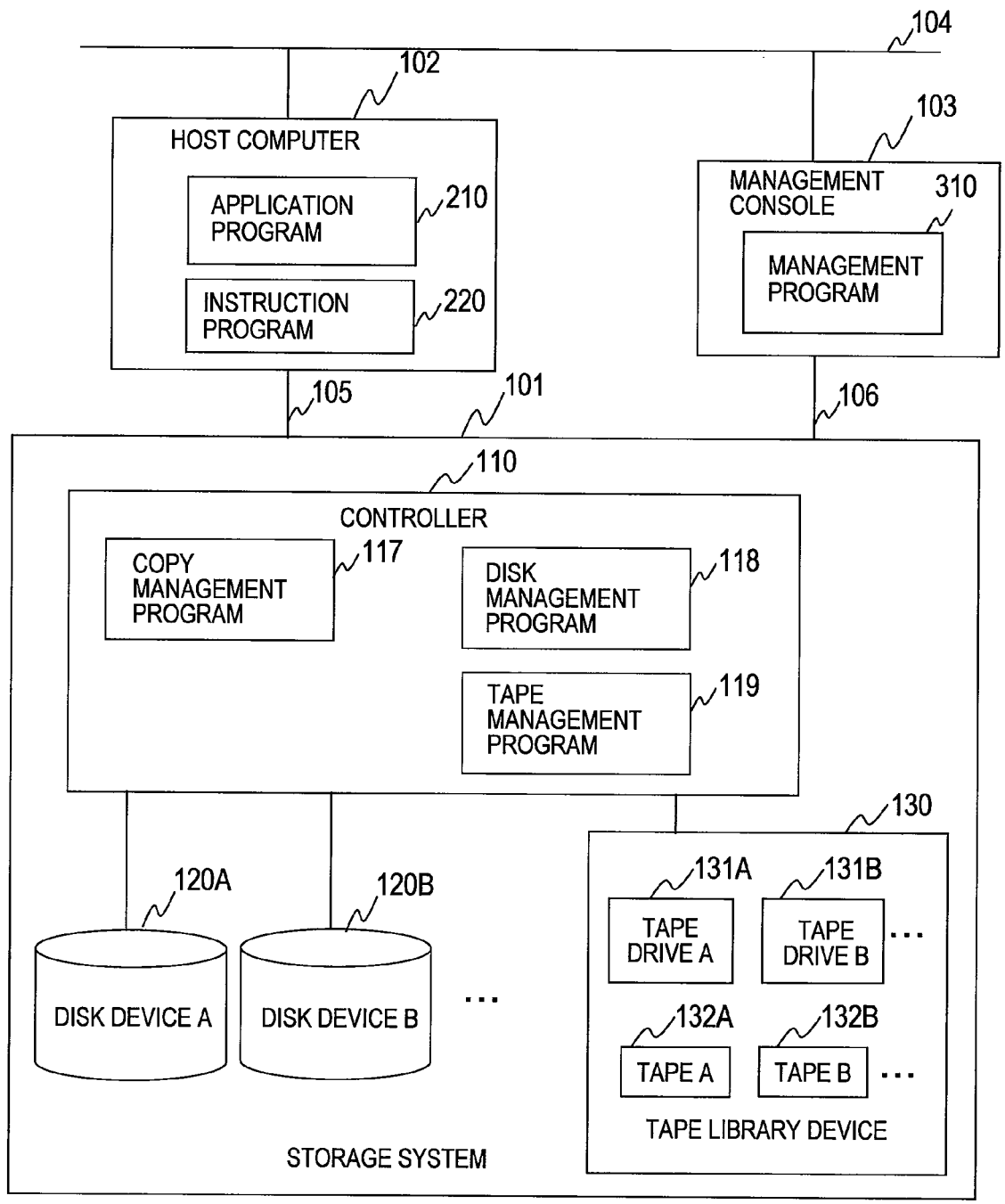
FIG. 1 is a block diagram showing a configuration of a computer system according to a first embodiment of this invention.

The preferred embodiments of this invention will be described referring to the drawings.

First, a first embodiment of this invention will be described.

FIG. 1 is a block diagram showing a configuration of a computer system according to the first embodiment of this invention.

The computer system of the embodiment includes a storage system 101, a host computer 102, and a management console 103.

The storage system 101 is connected to the host computer 102 via a network 105, and to the management console 103 via a network 106. The host computer 102 is connected to the management console 103 via a network 104.

The networks 104 to 106 may be networks of any types. For example, the networks 104 and 106 may be Internet protocol (IP) networks such as local area networks (LAN). The network 105 may be a network similar to the networks 104 and 106, or a storage area network to which a fibre channel (FC) protocol is applied.

The host computer 102 is a computer which provides various services to a user. The host computer 102 includes an interface (not shown) connected to the networks 104 and 105, a processor (not shown) connected to the interface, and a memory (not shown) connected to the processor.

The memory of the host computer 102 stores an application program 210 and an instruction program 220. The application program 210 is executed by the processor so that the host computer 102 can provide services to the user. The processor that executes the application program 210 issues an access request of data (data writing request or data reading request) in the storage system 101. The instruction program 220 is executed by the processor so that the user can instruct the storage system 101 to back up data. A process of the instruction program will be described later in detail referring to FIG. 13.

In the example of FIG. 1, the host computer 102 holds the instruction program 220. However, any device in the computer system is permitted to hold and execute the instruction program 220. For example, the management console 103 or the storage system 101 may hold and execute the instruction program 220.

The management console 103 is a computer for managing the computer system of the embodiment. The management console 103 includes an interface (not shown) connected to the networks 104 and 106, a processor (not shown) connected to the interface, and a memory (not shown) connected to the processor.

The memory of the management console 103 stores a management program 310. The management program 310 is executed by the processor to manage data backing-up of the storage system 101. A process of the management program 310 will be described later in detail referring to FIG. 12. The process executed by the management program 310 in the description below is actually executed by the processor (not shown) of the management console 103.

The storage system 101 stores data written by the host computer 102. The storage system 101 of the embodiment includes a controller 110, one or more disk devices 120, and one or more tape library devices 130.

The controller 110 holds at least a copy management program 117, a disk management program 118, and a tape management program 119 to control the disk device 120 and the tape library device 130. A configuration of the controller 110 will be described later in detail referring to FIG. 2.

The disk device 120 is typically a magnetic disk drive, but it may be a semiconductor memory device such as a flash memory, or one of other types of storage systems. Each of the disk device A 120A and the disk device B 120B shown in FIG. 1 is one of the plurality of disk devices 120. The storage system 100 may include more disk devices 120 (e.g., disk device 120 N shown in FIG. 3). The plurality of disk devices 120 may constitute redundant arrays of inexpensive disks (RAID).

Figure 3:
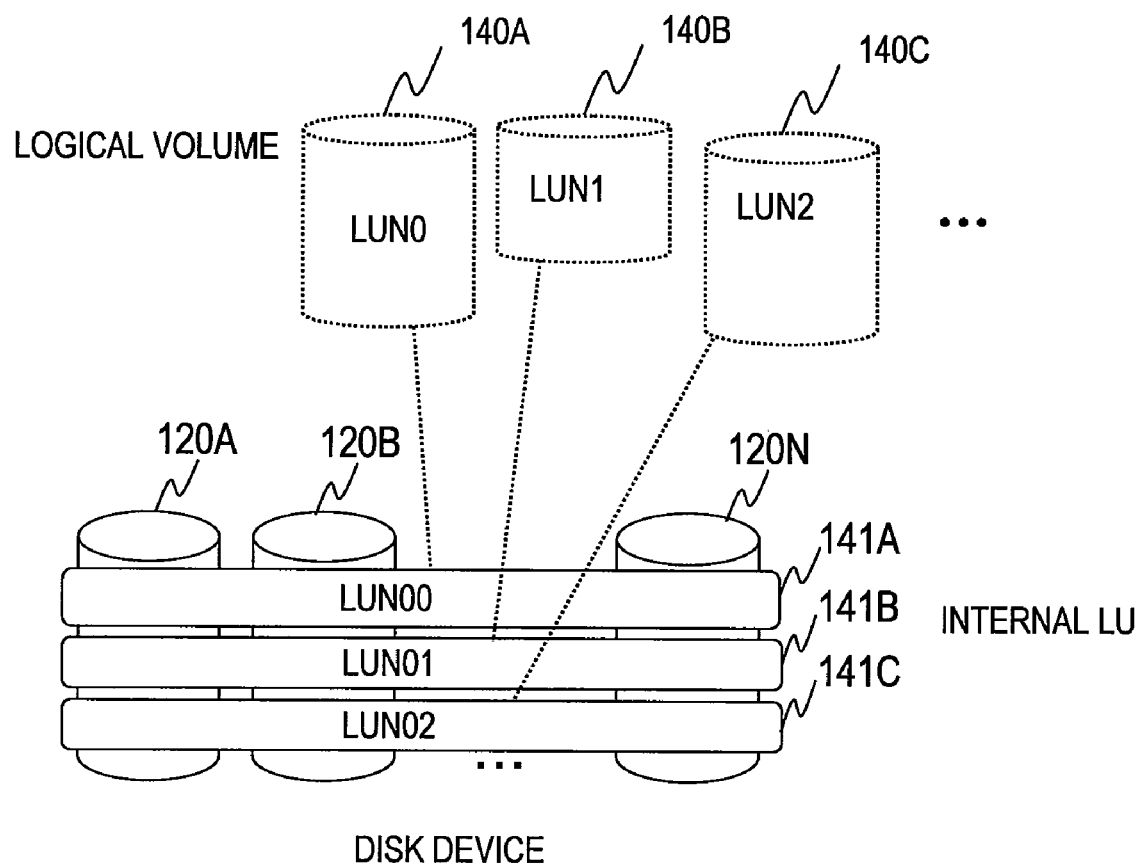
FIG. 3 is an explanatory diagram of a storage area provided by a disk device according to the first embodiment of this invention.

Referring to FIG. 3, a storage area provided by the disk device 120 will be described.

FIG. 3 is an explanatory diagram of a storage area provided by the disk device 120 according to the first embodiment of this invention.

In an example of FIG. 3, storage areas of a plurality of disk devices 120 are divided into one or more internal logical units (LU) 141 to be managed. For example, as shown in FIG. 3, a set of some storage areas of the disk devices 120 may be managed as one internal LU 141. Each of the internal LUs 141A, 141B, and 141C shown in FIG. 3 is one of a plurality of internal LUs 141. LUN 00, LUN 01, and LUN 02 shown in FIG. 3 are respectively identifiers of the internal LUs 141A, 141B, and 141C. The controller 110 can set an optional number of internal LUs 141 of optional capacities.

Each internal LU 141 corresponds to one logical volume 140. In the example of FIG. 3, logical volumes 140A, 140B, and 140C correspond to the internal LUs 141A, 141B, and 141C. Each of the logical volumes 140A, 140B, and 140C is one of a plurality of logical volumes 140. LUN 0, LUN 1, and LUN 2 shown in FIG. 3 are respectively identifiers of the logical volumes 140A, 140B, and 140C.

Each logical volume 140 is recognized as one logical storage device by the host computer 102. For example, when the host computer 102 issues a request of writing data in the logical volume 140A, the controller 110 stores requested data in the internal LU 141A corresponding to the logical volume 140A.

Referring back to FIG. 1, the tape library device 130 includes one or more tape drives 131 and one or more tapes 132. The tape library device 130 shown in FIG. 1 includes tape drive A 131A and tape drive B 131B, and tape A 132A and tape B 132B. Each of the tape drive A 131A and the tape drive B 131B is one of the plurality of tape drives 131. Each of the tape A 132A and tape B 132B is one of the plurality of tapes 132. Each tape 132 specifically corresponds to a roll of a tape storage medium. One or more tapes 132 may constitute one tape group 142 shown in FIGS. 4 and 5. The tape library device 130 may include more tape drives 132 and tapes 132.

Figure 2:
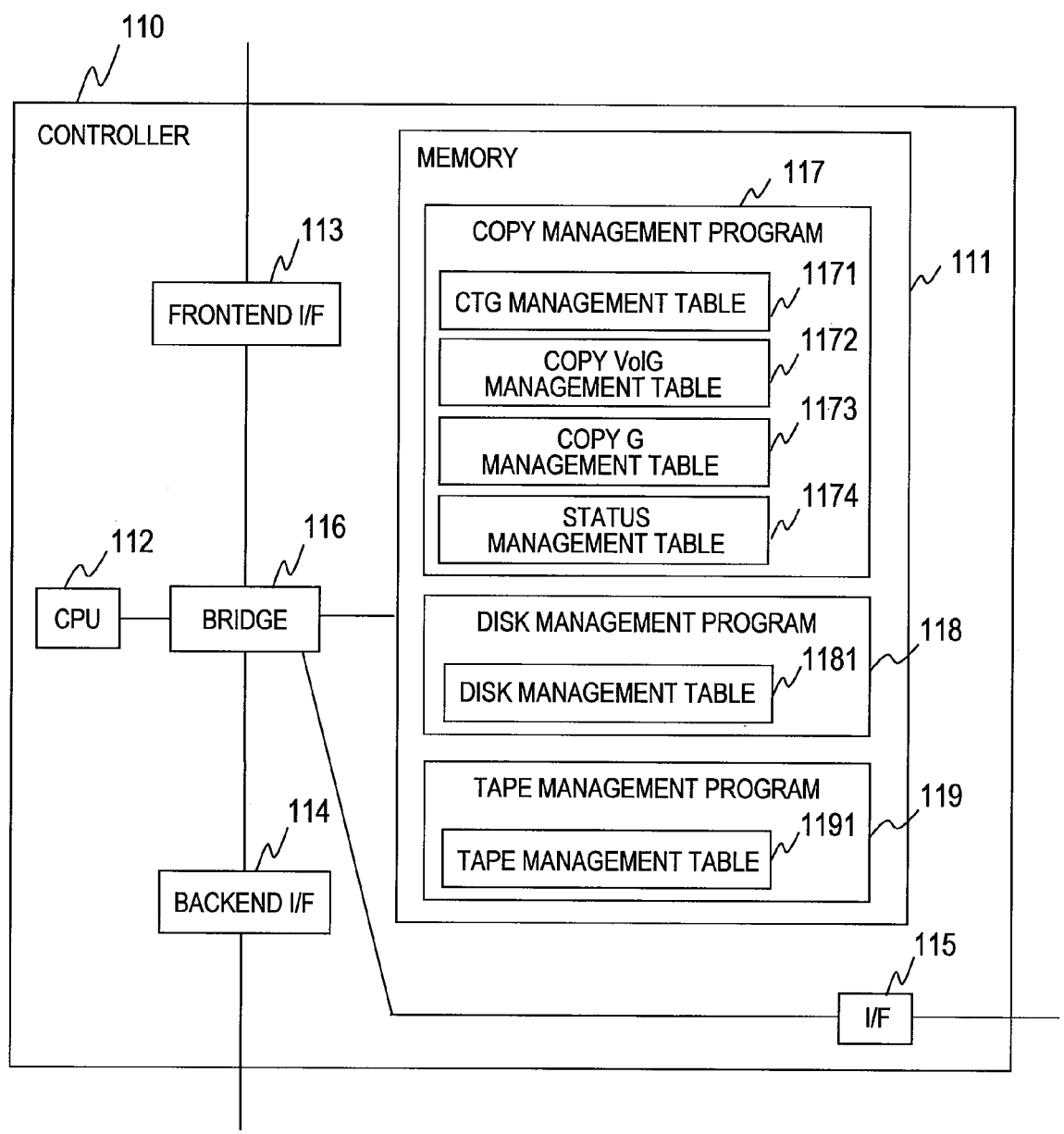
FIG. 2 is a block diagram showing a configuration of a controller according to the first embodiment of this invention.

FIG. 2 is a block diagram showing a configuration of the controller 110 according to the first embodiment of this invention.

The controller 110 of the embodiment includes a memory 111, a CPU 112, a frontend interface (IF) 113, a backend IF 114, an IF 115, and a bridge 116.

The memory 111 is a data storage system such as a semiconductor memory device. The memory 111 stores programs executed by the CPU 112 and data referred to by the CPU 112. In the memory 111 of the embodiment, at least a copy management program 117, a disk management program 118, and a tape management program 119 are stored.

The copy management program 117 includes a consistency group (CTG) management table 1171, a copy volume group (copy Vol G) management table 1172, a copy group (copy G) management table 1173, and a status management table 1174.

The disk management program 118 contains a disk management table 1181.

The tape management program 119 contains a tape management table 1191.

The programs and the tables will be described later in detail.

The CPU 112 is a processor for executing the programs stored in the memory 111. In the description below, a process executed by each program is actually executed by the CPU 112 which executes the program.

The frontend IF 113 is an interface for connecting the controller 110 to the host computer 102 via the network 105. The backend IF 114 is an interface for connecting the controller 110 to the disk device 120. The frontend IF 113 and the backend IF 114 may be, for example, a SCSI adaptor or a FC adaptor.

The IF 115 is an interface for connecting the controller 110 to the management console 103 via the network 106. When the network 106 is a LAN, the IF 115 may be a so-called network interface card.

The bridge 116 interconnects the memory 111, the CPU 112, the frontend IF 113, the backend IF 114, and the IF 115 to control communication executed among them.

Figure 4:
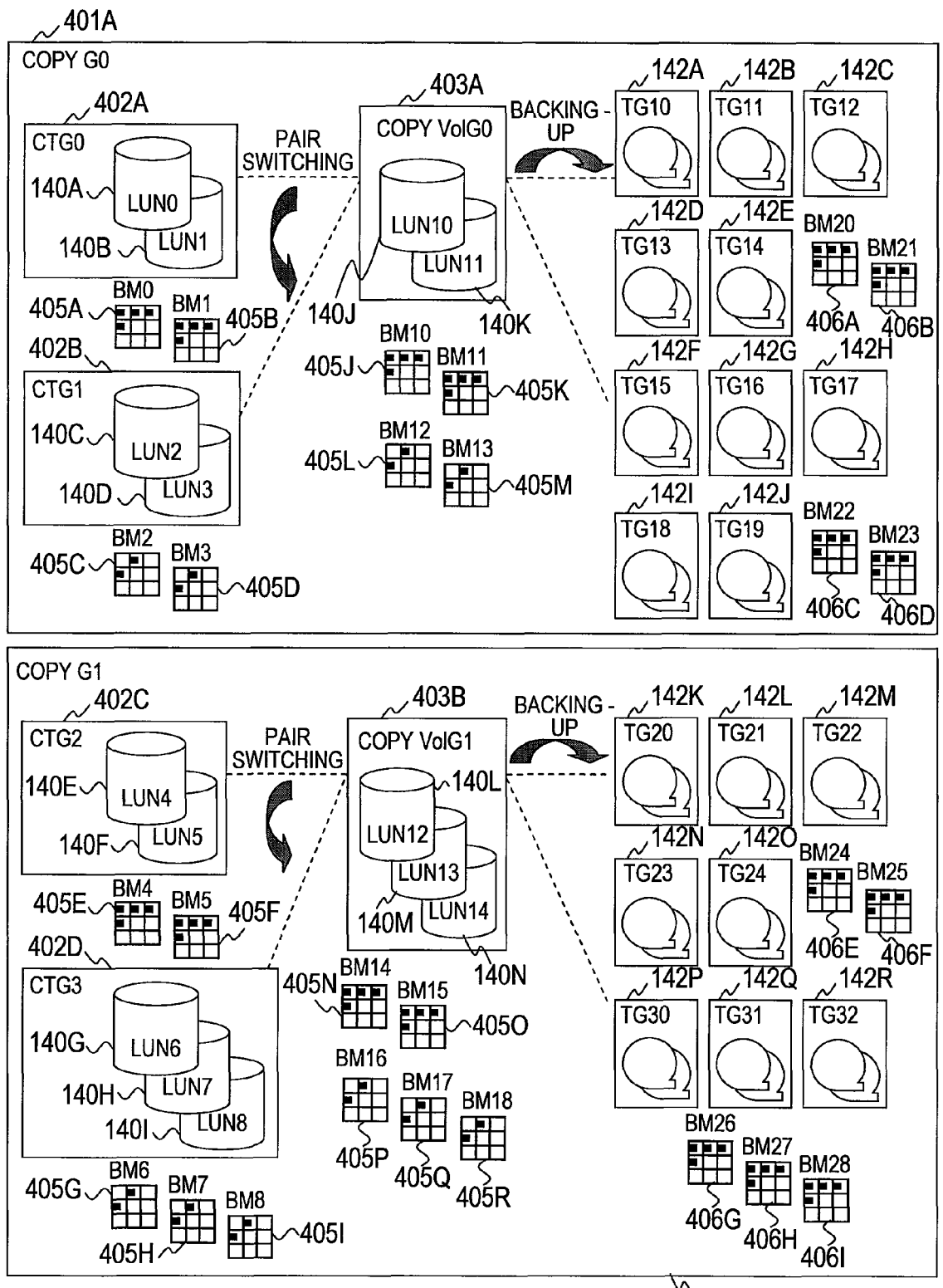
FIG. 4 is an explanatory diagram of an outline of backing-up executed according to the first embodiment of this invention.

FIG. 4 is an explanatory diagram of an outline of backing-up executed according to the first embodiment of this invention.

In FIG. 4, each of logical volumes 140A to 140N is one of a plurality of logical volumes 140. LUNs 0 to 8 shown in FIG. 4 are identifiers of the logical volumes 140A to 140I. LUNs 10 to 14 are identifiers of the logical volumes 140J to 140N. In the description below, each logical volume 140 is also represented by an identifier of the logical volume 140. For example, the logical volume 140A is represented as LUN 0.

The plurality of logical volumes 140 may constitute a consistency group (CTG) 402. The consistency group 402 is a set of logical volumes 140 for which data consistency has to be guaranteed. For example, a plurality of logical volumes regarding one instance of one application may constitute a consistency group 402, or a plurality of logical volumes 140 regarding one database may constitute a consistency group 402.

In an example of FIG. 4, the LUNs 0 and 1 constitute a consistency group 402A. The LUNs 2 and 3 constitute a consistency group 402B. The LUNs 4 and 5 constitute a consistency group 402C. The LUNs 6 to 8 constitute a consistency group 402D. Each of the consistency groups 402A to 402D is one of a plurality of consistency groups 402.

CTGs 0 to 3 shown in FIG. 4 are identifiers of the consistency groups 402A to 402D. In the description below, each consistency group 402 is also represented by an identifier of the consistency group 402. For example, the consistency group 402A is represented as CTG 0.

As described later, backup data obtained from the logical volume 140 is stored in the tape 132. The backup data is a copy of data stored in the logical volume 140 at the time of acquisition. The controller 110 can restore the logical volume 140 at the time of obtaining the backup data by using the backup data.

As described above, for the plurality of logical volumes 140 belonging to one consistency group 402, consistency of stored data has to be guaranteed. Accordingly, backup data of the plurality of logical volumes 140 belonging to one consistency group 402 have to be obtained at the same time.

For example, in FIG. 4, the LUNs 0 and 1 belong to the CTG 0. In this example, when the LUN 0 at a certain time and the LUN 1 at another time are restored, data stored in the LUNs 0 and 1 are inhibited from using because consistency of data stored in the plurality of logical volumes 140 at different times is not guaranteed.

Thus, when backup data of the LUN 0 is obtained at certain time to restore the LUNs 0 and 1 at the same point of time, backup data of the LUN 1 of this time also has to be obtained. When the LUN 0 is restored by using the backup data of the LUN 0, the LUN 1 also has to be restored by using the backup data of the LUN 1 obtained simultaneously with the backup data of the LUN 0.

The LUNs 10 to 14 are logical volumes 140 for storing copies of data stored in the LUNs 0 to 8. In the description below, the LUNs 0 to 8 which are copy sources of data will be collectively referred to as a primary volume (primary Vol), and the LUNs 10 to 14 which are copy destinations of data will be collectively referred to as a secondary volume (secondary Vol). A combination of the primary Vol with the secondary Vol for storing a copy of data stored in the primary Vol will be termed a copy pair. As described later, preferably, storage areas of different storage systems 120 are allocated to the primary Vol and the secondary Vol.

If the primary Vol belongs to the consistency group 402, the secondary Vol that stores a copy of data stored in the primary Vol also belongs to the consistency group. The consistency group constituted of the secondary Vol is referred to as a copy volume group (copy Vol G) 403 in FIG. 4. Each of copy volume groups 403A and 403B shown in FIG. 4 is one of a plurality of copy volume groups 403.

The copy Vol G0 and the copy Vol G1 shown in FIG. 4 are respectively identifiers of the copy volume groups 403A and 403B. In the description below, each copy volume group 403 is also represented by an identifier of the copy volume group 403. For example, the copy volume group 403A is represented as a copy Vol G0.

When the primary Vol and the secondary Vol for storing a copy of data stored in the primary Vol respectively belong to a consistency group 402 and a copy volume group 403, a combination of the consistency group 402 and the copy volume group 403 is referred to as a copy pair.

Figure 5:
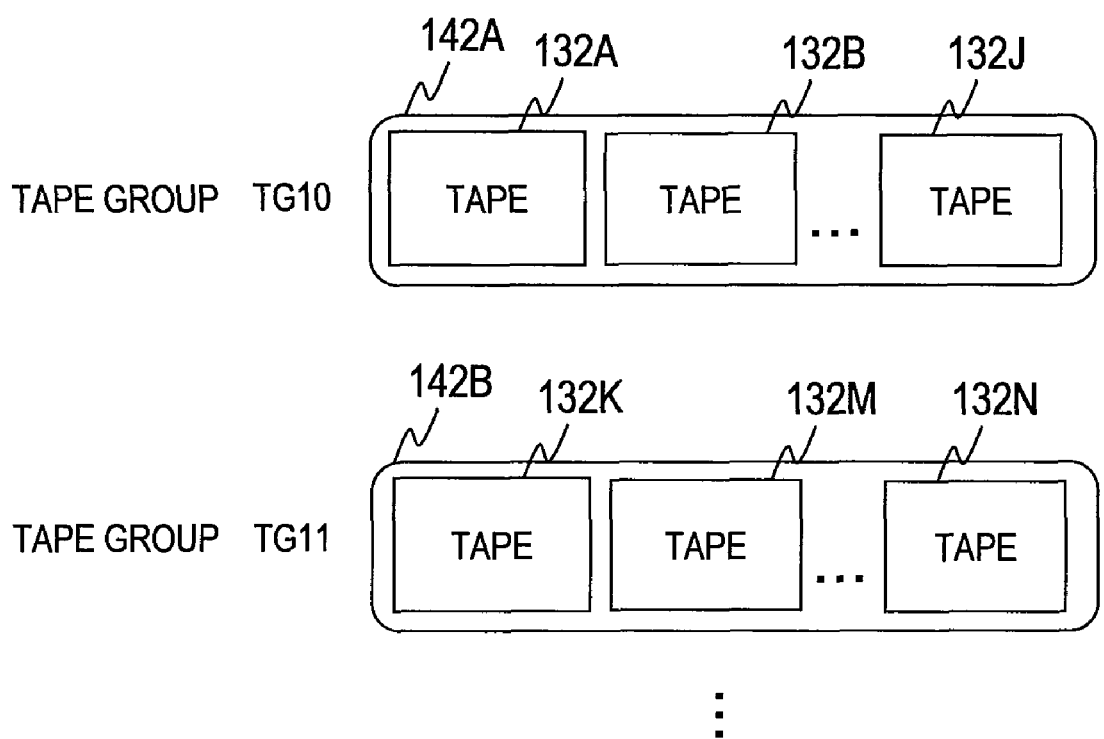
FIG. 5 is an explanatory diagram of a tape group according to the first embodiment of this invention.

Each tape group (TG) 142 includes one or more tapes 132 (refer to FIG. 5 for details). One tape group 142 corresponds to one consistency group 402. In other words, one tape group 142 stores at least a part of data stored in one consistency group 402.

Each of tape groups 142A to 142R shown in FIG. 4 is one of a plurality of tape groups 142. TGs 10 to 24 shown in FIG. 4 are identifiers of the tape groups 142A to 142O. TGs 30 to 32 are identifiers of the tape groups 142P to 142R. In the description below, each tape group 142 is also represented by an identifier of the tape group 142. For example, the tape group 142A is represented as TG 10.

The primary Vol is designated as a writing destination of data written by the application program 210 of the host computer 102. In other words, data written by the application program 210 is first stored in a certain primary Vol. The data stored in the primary Vol is copied to a secondary Vol. As a result, a copy of the data stored in the primary Vol is stored in the secondary Vol. The data stored in the secondary Vol is copied as backup data in the tape group 142. Such a data backup method is also called disk to disk to tape backup (D2D2T backup).

According to the D2D2T backup, the primary Vol is not involved in copying of backup data in the tape group 142. Thus, as long as storage area of different disk devices 120 are allocated to the primary Vol and the secondary Vol, data backing-up from the secondary Vol to the tape group 142 can be executed without affecting performance of the application program 210 in a process of writing data in the primary Vol.

Conventional D2D2T backup has necessitated one-to-one correspondence between a primary Vol and a secondary Vol for storing a copy of data stored in the primary Vol. In other words, the number of secondary Vols equal to that of primary Vols has had to be prepared. Each secondary Vol has to have at least a capacity equal to that of a corresponding primary Vol. Accordingly, to realize the conventional D2D2T backup, a disk device 120 of a capacity which is at least a double of the capacity of the primary Vol has had to be prepared.

According to the embodiment, however, one secondary Vol sequentially corresponds to a plurality of primary Vols by copy pair switching.

For example, at a certain point of time, the LUN 10 forms a copy pair with the LUN 0 (in other words, the LUN 10 corresponds to the LUN 0). In this case, a copy of data stored in the LUN 0 is stored in the LUN 10. Then, the data stored in the LUN 10 is copied in a certain tape group (e.g., TG 10).

Subsequently, as a result of copy pair switching, the LUN 10 forms a copy pair with the LUN 2. In this case, a copy of data stored in the LUN 2 is copied in the LUN 10. The data stored in the LUN 10 is copied in a certain tape group (e.g., TG 15).

Thus, according to the embodiment, as it is not necessary to prepare the number of secondary Vols equal to that of primary Vols, hardware costs of the storage system 101 can be reduced.

According to the embodiment, a set of one secondary Vol, primary Vols likely to correspond to the secondary Vol, and a tape 132 for backing-up data stored in the primary Vols is referred to as a copy group (copy G) 401. Each of copy groups 401A and 401B shown in FIG. 4 is one of a plurality of copy groups 401. Copies G0 and G1 shown in FIG. 4 are respectively identifiers of the copy groups 401A and 401B. In the description below, each copy group 401 is also represented by an identifier of the copy group 401. For example, the copy group 401A is represented as a copy G0.

The secondary Vol has to have a capacity at least equal to a largest capacity of one among a plurality of primary Vols likely to correspond to the secondary Vol. For example, in FIG. 4, the LUN 10 may correspond to the LUNs 0 and 2. If a capacity of the LUN 2 is larger than that of the LUN 0, the LUN 10 has to have a capacity at least equal to that of the LUN 2.

The copy volume group 403 has to include the number of logical volumes 140 equal to the largest number of logical groups 140 included in a plurality of consistency groups 402 likely to correspond to the copy volume group 403. For example, in FIG. 4, the copy Vol G1 may correspond to the CTGs 2 and 3. The CTG 2 includes two logical volumes 140. The CTG 3 includes three logical volumes 140. In this case, the copy Vol G1 has to include at least three logical volumes 140.

As described above, according to the embodiment, one secondary Vol is shared by a plurality of primary Vols by copy pair switching. In this case, for each copy pair switching, data stored in a new primary Vol belonging to the copy pair has to be copied in the secondary Vol. All data stored in the primary Vol may be copied in the secondary Vol. However, time required for copying is longer as a capacity of the primary Vol is larger. A bitmap 405 may be used for shorting the time for copying.

The bitmap 405 may be stored in the storage area of the memory 111, or the storage area of the disk device 120. Each of bitmaps 405A to 405R shown in FIG. 4 is one of a plurality of bitmaps 405. BM 0 to BM 8 shown in FIG. 4 are identifiers of the bitmaps 405A to 405I. BM 10 to BM 18 are identifiers of the bitmaps 405J to 405R. In the description below, each bitmap 405 is also represented by an identifier of the bitmap 405. For example, the bitmap 405A is represented as BM 0.

One bitmap 405 is allocated to one primary Vol. In the example of FIG. 4, BMs 0 to 8 are allocated to the LUNs 0 to 8.

A plurality of bitmaps 405 may be allocated to one secondary Vol. In the example of FIG. 4, BMs 10 and 12 are allocated to the LUN 10. In this example, the BM 10 is a bitmap 405 corresponding to the LUN 0, and the BM 12 is a bitmap 405 corresponding to the LUN 2. Similarly, BMs 11 and 13 are allocated to the LUN 11. BMs 14 and 16 are allocated to the LUN 12. BMs 15 and 17 are allocated to the LUN 13. The BM 18 is allocated to the LUN 14.

Each bitmap 405 includes a plurality of bits. Each bit of the bitmap 405 corresponds to a storage area of a logical volume 140 to which the bitmap 405 is allocated. A value of each bit of the bitmap 405 indicates whether data of the storage area corresponding to the bit has been updated, in other words, whether the data of the storage area corresponding to the bit has to be copied from a primary Vol to a secondary Vol.

Specifically, if a value of a bit of a bitmap 405 allocated to the primary Vol is "ON", it indicates that data of a storage area of the primary Vol corresponding to the bit has been updated, but the updated data is yet to be copied in the secondary Vol. If a value of a bit of a bitmap 405 allocated to the secondary Vol is "ON", it indicates that data of a storage area of the secondary Vol corresponding to the bit has been updated by data other than data of the primary Vol corresponding to the bitmap 405.

For example, in FIG. 4, the BM 0 is allocated to the LUN 0. Upon updating of data of the LUN 0, a bit of the BM 0 corresponding to an area in which the data has been stored is set to "ON". Then, when the data is copied to the LUN 10, a bit of the BM 0 corresponding to an area including the data is set to "OFF".

In FIG. 4, the BM 10 allocated to the LUN 10 corresponds to the LUN 0. In this example, when data stored in the LUN 2 is copied to the LUN 10, a bit of the BM 10 corresponding to an area in which the data has been stored is set to "ON". When data stored in the LUN 0 is newly copied in an area in which the data has been stored, a bit of the BM 10 corresponding to the area in which the data has been stored is set to "OFF".

Thus, a bit of the bitmap 405 corresponding to an area in which synchronization is not guaranteed between the primary Vol and the secondary Vol is set to "ON".

A value "1" of a bit of the bitmap 405 may correspond to "ON", and a value "0" may correspond to "OFF". Alternatively, a value "0" may correspond to "ON", and a value "1" may correspond to "OFF".

Methods of setting and using a bitmap 405 will be described later in detail referring to FIGS. 13 to 15.

According to the embodiment, a bitmap 406 may be used for backing-up data in the tape group 142. The bitmap 406 may be stored in the storage area of the memory 111, or the storage area of the disk device 120. The bitmap 406 is stored in the tape group 142 in addition to backup data when data backing-up in the tape group 142 is executed.

Each of bitmaps 406A to 406I shown in FIG. 4 is one of a plurality of bitmaps 406. BMs 20 to 28 shown in FIG. 4 are identifiers of the bitmaps 406A to 406I. In the description below, each bitmap 406 is also represented by an identifier of the bitmap 406.

The bitmap 406 is a copy of a bitmap 406 allocated to the primary Vol. Method of setting and using the bitmap 406 will be described later in detail referring to FIGS. 13 to 15.

FIG. 5 is an explanatory diagram of the tape group 142 according to the first embodiment of this invention.

Each tape group 402 corresponds to a consistency group 402. When a required storage capacity of one tape group 142 is larger than that of one tape 132, one tape group 142 includes a plurality of tapes 132. In an example of FIG. 5, a tape group 142A includes tapes 132A to 132J. A tape group 142B includes tapes 132K to 132N.

FIG. 6 is an explanatory diagram of a CTG management table 1171 according to the first embodiment of this invention.

The CTG management table 1171 manages an identifier of a logical volume 140 included in each consistency group 402.

The CTG management table 1171 includes CTG-ID 11711 and LUN 11712.

The CTG-ID 11711 indicates an identifier of the consistency group 402. In an example of FIG. 6, "0" to "3" are stored as CTG-ID 11711. These correspond to the CTG 0 to CTG 3 shown in FIG. 4.

The LUN 11712 indicates an identifier of a logical volume 140 included in each consistency group 402. In the example of FIG. 6, "0" and "1" are stored as the LUN 11712 corresponding to the CTG 0. These correspond to the LUNs 0 and 1 shown in FIG. 4. In other words, it means that the CTG 0 includes the LUN 0 and the LUN 1 as shown in FIG. 4.

FIG. 7 is an explanatory diagram of a copy Vol G management table 1172 according to the first embodiment of this invention.

The copy Vol G management table 1172 manages an identifier of a logical volume 140 included in each copy volume group 403.

The copy Vol G management table 1172 includes a copy Vol G-ID 11721 and LUN 11722.

The copy Vol G-ID 11721 indicates an identifier of the copy volume group 403. In an example of FIG. 7, "0" and "1" are stored as copy Vol G-ID 11721. These correspond to the copy Vol G0 and the copy Vol G1 shown in FIG. 4.

The LUN 11722 indicates an identifier of a logical volume 140 included in each copy volume group 403. In the example of FIG. 7, "10" and "11" are stored as the LUN 11722 corresponding to the copy Vol G0. These correspond to the LUNs 10 and 11 shown in FIG. 4. In other words, it means that the copy Vol G0 includes the LUN 10 and the LUN 11 as shown in FIG. 4.

FIG. 8 is an explanatory diagram of a copy group management table 1173 according to the first embodiment of this invention.

The copy group management table 1173 manages a component of each copy group 401 (e.g., logical volume 140 included in each copy group 401).

The copy group management table 1173 includes copy G-ID 11731, copy Vol G-ID 11732, CTG-ID 11733, TG-ID 11734, primary Vol BM-ID 11735, secondary Vol BM-ID 11736, and tape copy BM-ID 11737.

The copy G-ID 11731 indicates an identifier of the copy group 401. In an example of FIG. 8, "0" and "1" are stored as copy G-ID 11731. These correspond to the copy G0 and the copy G1 shown in FIG. 4, respectively.

The copy Vol G-ID 11732 indicates an identifier of a copy volume group 403 as in the case of the copy Vol G-ID 11721 of FIG. 7. For example, in FIG. 8, "0" is stored as copy Vol G-ID 11732 corresponding to the copy G0. It means that the copy G0 includes the copy Vol G0 as shown in FIG. 4.

The CTG-ID 11733 indicates an identifier of the consistency group 402 as in the case of the CTG-ID 11711 of FIG. 6. For example, in FIG. 8, "0" and "1" are stored as CTG-ID 11733 corresponding to the copy Vol G0. It means that the copy Vol G0 corresponds to the CTG 0 and the CTG 1, in other words, the copy Vol G is shared as a copy destination of data by the CTG 0 and the CTG 1 as shown in FIG. 4.

The TG-ID 11734 indicates an identifier of the tape group 142. For example, a value "10" stored in the TG-ID 11734 corresponds to the TG 10 of FIG. 4. For example, in FIG. 8, "10" to "14" are stored as the TG-ID 11734 corresponding to the CTG 0. It means that data stored in the CTG 0 is backed up in the TGs 10 to 14.

The primary Vol BM-ID 11735 indicates an identifier of the bitmap 405 allocated to the primary Vol. For example, a value "0" stored in the primary Vol BM-ID 11735 corresponds to the BM 0 shown in FIG. 4. For example, in FIG. 8, "0" and "1" are stored as the primary Vol BM-ID 11735 corresponding to the CTG 0. It means that the BMs 0 and 1 are allocated to the primary Vol (i.e., LUNs 0 and 1) included in the CTG 0.

The secondary Vol BM-ID 11736 indicates an identifier of the bitmap 405 allocated to the secondary Vol. For example, a value "10" stored in the secondary Vol BM-ID 11736 corresponds to the BM 10 shown in FIG. 4. For example, in FIG. 8, "10" and "11" are stored as the secondary Vol BM-ID 11736 corresponding to the CTG 0. It means that the BMs 10 and 11 are allocated as the bitmap 405 corresponding to the CTG 0 to the secondary Vol (i.e., LUNs 10 and 11) included in the copy Col G0. For example, the BM 10 is allocated to the LUN 10, and corresponds to the LUN 0. The BM 11 is allocated to the LUN 11, and corresponds to the LUN 1.

The tape copy BM-ID 11737 indicates an identifier of a bitmap 406 used for backing up data in the tape group 142. For example, a value "20" stored in the tape copy BM-ID 11737 corresponds to the BM 20 shown in FIG. 4. For example, in FIG. 8, "20" and "21" are stored as the tape copy BM-ID 11737 corresponding to the CTG 0. It means that the BMs 20 and 21 are used for backing up data in the TGs 10 to 14.

FIG. 9 is an explanatory diagram of the status management table 1174 according to the first embodiment of this invention.

The status management table 1174 manages a status of a copy pair set between the consistency group 402 and the copy volume group 403.

The status management table 1174 includes copy G-ID 11741, copy Vol G-ID 11742, Current CTG-ID 11743, Current TG-ID 11744, and a status 11745.

The copy G-ID 11741 indicates an identifier of the copy group 401 as in the case of the copy Vol G-ID 11731 of FIG. 8.

The copy Vol G-ID 11742 indicates an identifier of the copy volume group 403 as in the case of the copy Vol G-ID 11732 of FIG. 8.

The Current CTG-ID 11743 indicates an identifier of a current consistency group, in other words, an identifier of a consistency group 402 forming a copy pair with a current copy volume group 403. For example, in FIG. 9, "0" is stored as the Current CTG-ID 11743 corresponding to the copy Vol G0, and "3" is stored as the Current CTG-ID 11743 corresponding to the copy Vol G1. It means that at present the CTG 0 and the copy Vol G0 form a copy pair, and the CTG 3 and the copy Vol G1 form a copy pair.

The Current TG-ID 11744 indicates an identifier of a tape group 142 set as a copy destination of currently executed backing-up (data copying from the copy volume group 403 to the tape group 142). If no data backing-up is executed at present, a value indicating that no backing-up is being executed may be stored in the Current TG-ID 11744, or no valid value may be stored.

For example, in FIG. 9, "30" is stored as Current TG-ID 11744 corresponding to the CTG 3 and the copy Vol G1 while no valid value is stored as Current TG-ID 11744 corresponding to the CTG 0 and the copy Vol G0. It means that at present, copying is executed from the copy Vol G1 to the TG 30 while no copying is executed from the copy Vol G0 to the tape group 142.

The status 11745 indicates a status of a copy pair. Specifically, one selected from "PAIR", "SUSPENDED", "COPY", and "TAPE COPY" is stored in the status 11745.

The status "PAIR" indicates a status where when data is written in a primary Vol of a copy pair, a process of transferring a copy of the written data to a secondary Vol to write the data therein is executed. As a result, updating of the primary Vol is reflected in the secondary Vol. For example, after data is written in the primary Vol, and a copy of the data is written in the secondary Vol, a completion notification of a process of writing in the primary Vol may be transmitted to the host computer 102.

The status "SUSPENDED" indicates a state where even when data is written in the primary Vol of the copy pair, a copy of the written data is not transferred to the secondary Vol. Accordingly, while the status of the copy pair is "SUSPENDED", updating of the data in the primary Vol is not reflected in the secondary Vol.

The status "COPY" indicates a transitional status set when the status of the copy pair is changed from "SUSPENDED" to "PAIR". Specifically, in the copy pair whose status is "COPY", all data stored in the primary Vol may be copied in the secondary Vol.

Alternatively, only data of an area updated in the primary or secondary Vol while the status of the copy pair is "SUSPENDED" may be copied form the primary Vol to the secondary Vol. Specifically, only data of an area corresponding to a bit set to "ON" at least in one of the bitmaps 405 respectively allocated to the primary Vol and the secondary Vol may be copied from the primary Vol to the secondary Vol. At a point of time when the data stored in the secondary Vol matches the data stored in the primary Vol, the status of the copy pair is changed from "COPY" to "PAIR".

The status "TAPE COPY" indicates a status where copying of data stored in the copy volume group 403 to the tape group 142 is executed. For the copy pair whose status is "TAPE COPY", as in the case of the status "SUSPENDED", no data copying is executed from the primary Vol to the secondary Vol.

For example, in FIG. 9, "PAIR" is stored as the status 11745 corresponding to the CTG 0 and the copy Vol G0. It means that at present, when data is written in the CTG 0, a copy of the written data is also written in the copy Vol G0. On the other hand, "TAPE COPY" is stored as the status 11745 corresponding to the CTG 3 and the copy Vol G1. It means that at present, copying is executed from the copy Vol G1 to the tape group 142 (TG 30 in the example of FIG. 9).

FIG. 10 is an explanatory diagram of the disk management table 1181 according to the first embodiment of this invention.

The disk management table 1181 holds information necessary for managing the storage area of the disk device 120.

The disk management table 1181 includes a logical volume ID 1811, an internal LUN 11812, a LU size 11813, and a physical disk address 11814.

The logical volume ID 11811 indicates an identifier of the logical volume 140. For example, in FIG. 10, "0" and "1" are stored as the logical volume ID 11811. These correspond to the LUNs 0 and 1 shown in FIGS. 3 and 4, respectively.

The internal LUN 11812 indicates an identifier of the internal LU 141 corresponding to the logical volume 140. For example, in FIG. 10, "00" and "01" are stored as the internal LUN 11812 corresponding to the LUNs 0 and 1. These correspond to the LUNs 00 and 01 shown in FIG. 3, respectively.

The LU size 11813 indicates a size of a storage area allocated to each internal LU 141, i.e., a capacity of data to be stored in the storage area. For example, in FIG. 10, "1 TERABYTES (TB)" AND "500 GIGABYTES (GB)" are stored as the LU size 11813 corresponding to the LUNs 00 and 01. It means that storage areas of 1 TB and 500 GB are allocated as the LUNs 00 and 01.

The physical disk address 11814 indicates an address of a storage area of the disk device 120 allocated to each LU 141. For example, in FIG. 10, "A: 0-2000, B*0-2000, . . . , N: 0-2000" are stored as the physical disk address 11814 corresponding to the LUN 00. It means that at least storage areas from an address 0 to an address 2000 of the disk device 120A, from an address 0 to an address 2000 of the disk device 120B, and from an address 0 to an address 2000 of the disk device 120N are allocated as the LUN 00.

Though not shown in FIG. 10, the disk management table 1181 may further store a logical volume ID 11811, an internal LUN 11812, a LU size 11813, and a physical disk address 11814 corresponding to the LUNs 2 to 14 shown in FIG. 4.

FIG. 11 is an explanatory diagram of the tape management table 1191 according to the first embodiment of this invention.

The tape management table 1191 holds information necessary for managing the tape group 142.

The tape management table 1191 includes TG-ID 11911, Tape-ID 11912, and a Keyword 11913.

The TG-ID 11911 indicates an identifier of the tape group 142. For example, in FIG. 11, "10", "11", and "12" are stored as the TG-ID 11911. These correspond to the TGs 10 to 12 shown in FIG. 4, respectively.

The Tape-ID 11912 indicates an identifier of a tape 132 included in each tape group 142. For example, in FIG. 11, "1000, 1001, and 1002" are stored as the Tape-ID 11912 corresponding to the TG 10. It means that the TG 10 includes three tapes 132 identified by the identifiers "1000", "1001", and "1002".

The Keyword 11913 indicates a keyword used when the user retrieves the tape group 142. The user can designate an optional keyword for backing up data in the tape group 142. For example, the user may designate an identifier of the consistency group 402 which is a backup source or a date of executing backing-up as a keyword. The keyword thus designated is stored as the Keyword 11913. In the example of FIG. 11, "ABCDE" is stored as the Keyword 11913 corresponding to the TG 10.

The user can copy data stored in the tape group 142 to the logical volume 140 to restore the consistency group 402. When executing this copying, the user can designate a tape group 142 as a copy source by a keyword stored in the Keyword 11913 (refer to FIG. 16).

Though not shown in FIG. 11, the tape management table 11911 may further store TG-ID 11911, Tape-ID 11912, and Keyword 11913 corresponding to the TGs 13 to 32 shown in FIG. 4.

Next, referring to flowcharts, processes executed according to the embodiment will be described.

Description below is directed to a case where a plurality of logical volumes 140 constitute a consistency group 402. It should be understood, however, that this invention can be applied to a case where no consistency group 402 is constituted. In such a case, the description below can be applied by presuming that one logical volume 140 constitutes one consistency group 402. In this case, an identifier of the logical volume 140 may be used as an identifier of the consistency group 402.

Figure 12:
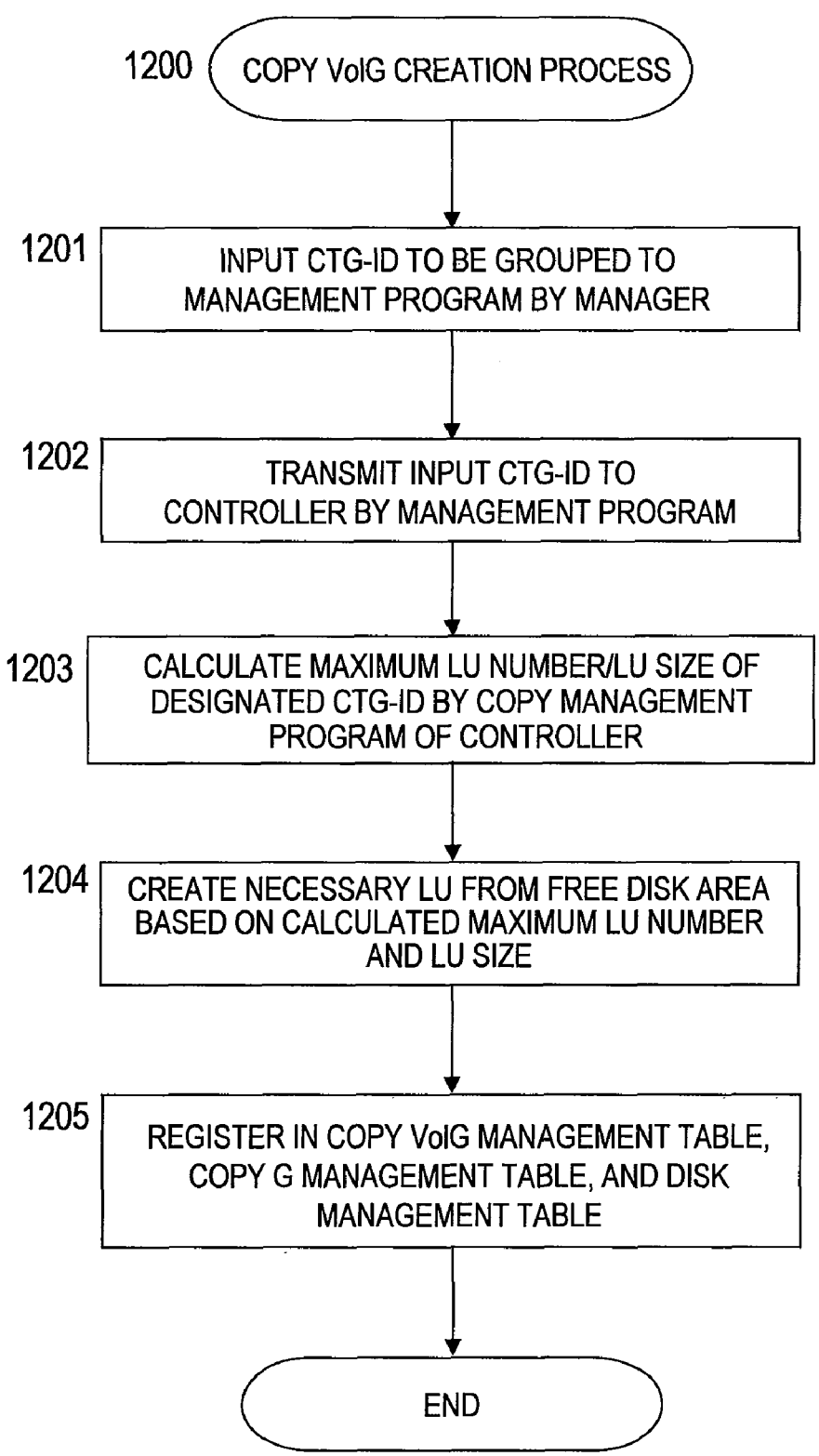
FIG. 12 is a flowchart of a copy volume group creation process executed according to the first embodiment of this invention.

FIG. 12 is a flowchart of a copy volume group creation process 1200 executed according to the first embodiment of this invention.

The process shown in FIG. 12 is executed to create a copy volume group 403 corresponding to a plurality of consistency groups 402.

Upon a start of the copy volume group creation process 1200, a manager inputs identifiers of a plurality of consistency groups 402 to be formed into a group to the management program 310 (step 1201). The plurality of consistency groups 402 formed into a group mean a plurality of consistency groups 402 serving as sources of data to be copied to one copy volume group 403. For example, in the step 1201, CTGs 0 and 1 may be input to create the copy Vol G0 shown in FIG. 4.

The management program 310 transmits the identifiers input in the step 1201 to the controller 110 (step 1202).

The copy management program 117 of the controller 110 refers to the disk management table 1181 to calculate a maximum number of logical volumes and a maximum logical volume size of the plurality of consistency groups 402 identified by the identifiers input in the step 1201 (step 1203).

The disk management program 118 creates a logical volume 140 necessary for creating a copy volume group 403 from a free disk capacity of the storage system 101 based on the maximum number of logical volumes and the maximum logical volume size calculated in the step 1203. If unallocated internal LUs 141 (internal LU 141 not corresponding to the logical volume 140) are present in the storage system 101, an internal LU (internal LU of a size equal to or larger than a necessary capacity) which satisfies requirements may be selected from the unallocated internal LUs 141 to be used as a logical volume (step 1204).

For example, as shown in the copy G1 of FIG. 4, when the CTG 2 including two logical volumes 140 and the CTG 3 including three logical volumes 140 are formed into a group, "3" which is a maximum number of logical volumes therein is calculated as a maximum number of logical volumes (step 1203). In this case, three logical volumes 140 (LUNs 12 to 14) are created for the copy Vol G1 (step 1204).

Additionally, in this case, a size of larger one of the LUNs 4 and 6, a size of larger one of the LUNs 5 and 7, and a size of the LUN 8 are calculated as maximum logical volume sizes (step 1203). The calculated sizes (or sizes larger than these) are respectively set as sizes of the LUNs 12 to 14 (step 1204). For example, when the LUN 4 is larger in size than the LUN 6, and the LUN 5 is larger in size than the LUN 7, a storage area of a capacity at least equal to that of the LUN 4 is allocated to the LUN 12, a storage area of a capacity at least equal to that of the LUN 5 is allocated to the LUN 13, and a storage area of a capacity at least equal to that of the LUN 8 is allocated to the LUN 14.

The copy management program 117 registers an identifier of the created logical volume 140 and information regarding the created copy volume group 403 in the copy Vol G management table 1172 and the copy group management table 1173 (step 1205). Additionally, in the step 1205, the disk management program 118 registers the identifier, the size and the address of the created or selected logical volume 140 in the disk management table 1181.

Then, the copy volume group creation process 1200 is finished.

Figure 13:
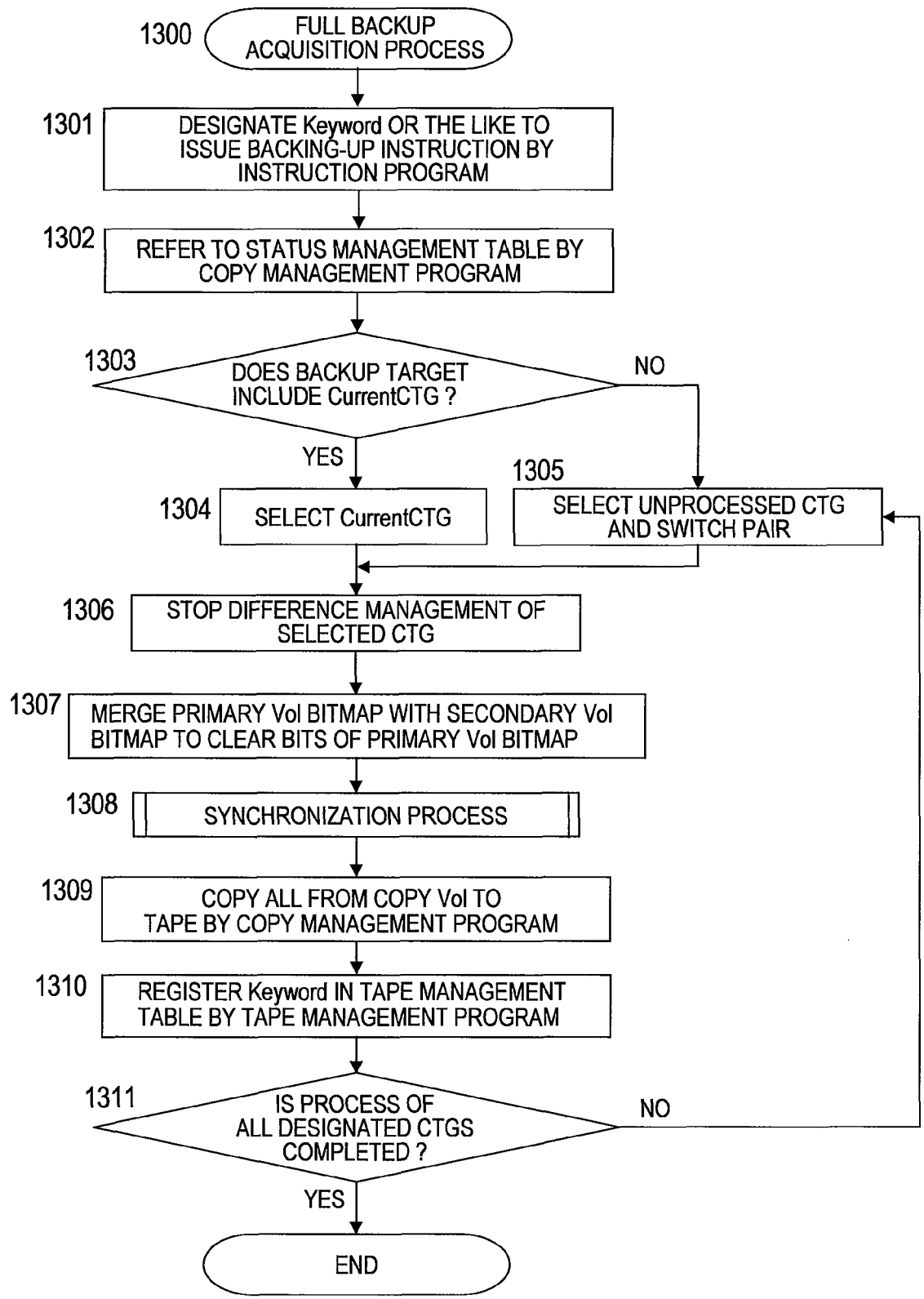
FIG. 13 is a flowchart of a full backup acquisition process executed according to the first embodiment of this invention.

FIG. 13 is a flowchart of a full backup acquisition process 1300 executed according to the first embodiment of this invention.

The full backup acquisition process 1300 is a process of storing copies of all data stored in the consistency group 402 in the tape group 142. As described above referring to FIG. 4, the data stored in the consistency group 402 is copied in the tape group 142 via the copy volume group 403.

When the instruction program 220 issues a backup instruction, the full backup acquisition process 1300 is started (step 1301). This backup instruction includes information designating a consistency group 402 of a backup target, a copy group 401 including the consistency group 402, and a keyword. The consistency group 402 of the backup target is a consistency group 402 serving as a copy source of data to be copied in the backing-up.

The consistency group 402 of the backup target and the copy group 401 including the consistency group 402 are designated by their identifiers. Only one consistency group 402 may be designated as a backup target, or a plurality of consistency groups 402 may be designated as backup targets. Information designated by the backup instruction may be input by a user of the instruction program 220.

The copy management program 117 that has received the backup instruction refers to the status management table 1174 (step 1302).

The copy management program 117 judges whether one or the plurality of consistency groups 402 designated as the backup targets include a current consistency group (Current CTG) (step 1303). Specifically, if one of the identifiers of one or the plurality of consistency groups 402 designated as the backup targets has been registered in the CurrentCTG-ID 11743 of the status management table 1174, the copy management program 117 judges "INCLUDED (YES)" in the step 1303.

If "YES" is judged in the step 1303, the copy management program 117 selects a current consistency group of this time (step 1304).

On the other hand, if "NO" is judged in the step 1303, the copy management program 117 selects one of unprocessed consistency groups 402 to switch a pair so that the selected consistency group can become a current consistency group. In this case, to reduce the amount of data to be synchronized as much as possible, a group may be selected from consistency groups of small total capacities among the unprocessed consistency groups (step 1305). The unprocessed consistency groups mean those of one or more consistency groups 402 designated as the backup targets where stored data are yet to be copied in the tape group by the current full backup acquisition process.

Specifically, in the step 1305, an identifier of the selected unprocessed consistency group is newly registered in the CurrentCTG-ID 11743 of the status management table 1174. As a result of the step 1305, the selected unprocessed consistency group 402 forms a copy pair with the copy volume group 403.

After the execution of the step 1304 or 1305, the process proceeds to step 1306.

In the step 1306, the copy management program 117 stops difference management of the consistency group 402 selected in the step 1304 or 1305. Thereafter, when the host computer 102 makes a writing request in the selected consistency group 402, the bitmap 405 is not updated. Data requested to be written is stored in the selected consistency group 402, and a copy of the data is stored in the copy volume group 403.

The copy management program 117 merges a primary Vol bitmap with a secondary Vol bitmap (step 1307). In the description of FIGS. 13 to 15, the primary Vol bitmap means a bitmap 405 allocated to the selected consistency group 402. In the description of FIGS. 13 to 15, the secondary Vol bitmap means a bitmap 405 corresponding to the selected consistency group 402 among bitmaps 405 allocated to the copy volume groups 403.

Specifically, in step 1307, the copy management program 117 compares each bit of the secondary Vol bitmap with a corresponding bit of the primary Vol bitmap. If at least one of the bits is "ON", the bit of the secondary Vol bitmap is set to "ON". In the step 1307, the copy management program 117 clears all bits of the primary Vol bitmap when the merging is finished (in other words, set all the bits to "OFF").

The copy management program 117 executes a synchronization process 1500 (step 1308). The synchronization process 1500 will be described below in detail referring to FIG. 15. As a result of the synchronization process 1500, data identical to those stored in the selected consistency group 402 are stored in the copy volume group 403.

The copy management program 117 copies all the data stored in the copy volume group 403 as backup data in the tape group 142 (step 1309). Specifically, the copy management program 117 sequentially reads all the data stored in the copy volume group 403, and sequentially stores the read data in the tape group 142.

The tape management program 119 registers the keyword designated in the step 1301 in the Keyword 11913 of the tape management table 1191 (step 1310).

The copy management program 117 judges whether the process of all the consistency groups 402 designated in the step 1301 has been completed, in other words, whether the data stored in all the designated consistency groups 402 have been copied in the tape group 142 (step 1311).

If it is judged in the step 1311 that the process of all the designated consistency groups 402 is yet to be completed, the process returns to the step 1305 to execute a process for the remaining consistency groups 402.

On the other hand, if it is judged in the step 1311 that the process of all the designated consistency groups 402 has been completed, the full backup acquisition process 1300 is finished.

Figure 14:
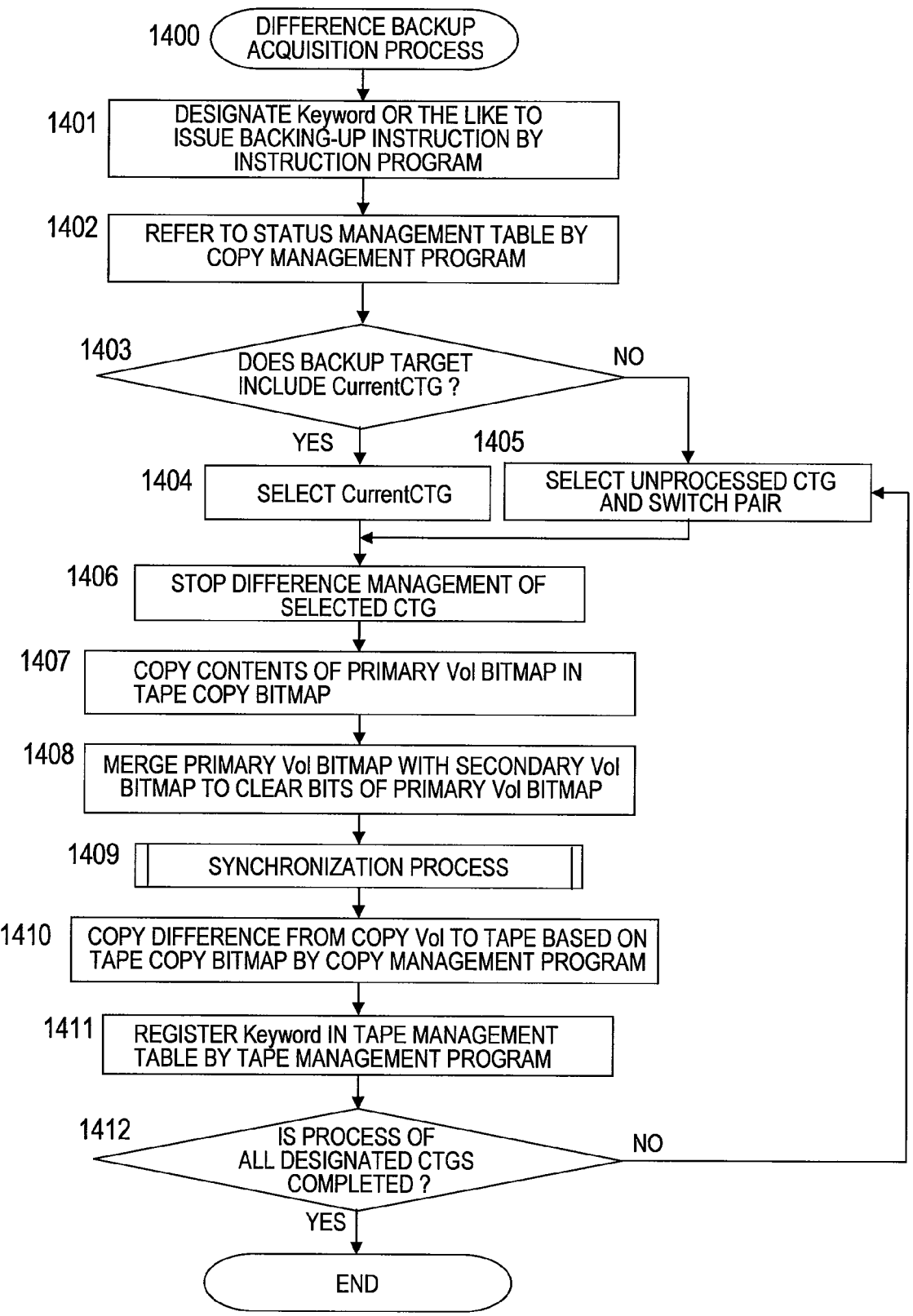
FIG. 14 is a flowchart of a difference backup acquisition process executed according to the first embodiment of this invention.

FIG. 14 is a flowchart of a difference backup acquisition process 1400 executed according to the first embodiment of this invention.

The difference backup acquisition process 1400 is a process for storing only a copy of data updated (difference data) after last backing-up is executed among the data stored in the consistency group 402. Description of steps of the difference backup acquisition process 1400 similar to those of the full backup acquisition process 1300 will be omitted.

Steps 1401 to 1406 of the difference backup acquisition process 1400 are similar to the steps 1301 to 1306 of FIG. 13.

The copy management program 117 copies contents of the primary Vol bitmap in a tape copy bitmap after the step 1406 (step 1407). In the description of FIG. 14, the tape copy bitmap means a bitmap 406 allocated to a tape group 142 which is a copy destination of backup data. As a result of the step 1407, data of a storage area of a consistency group 402 which is a copy source, corresponding to an "ON" bit of the tape copy bitmap, is updated after execution of last backing-up.

Subsequently executed steps 1408 and 1409 are similar to the steps 1307 and 1308 of FIG. 13.

The copy management program 117 copies data stored in the copy volume group 403 in the tape group 142 based on the tape copy bitmap copied in the step 1407 (step 1410). Specifically, the copy management program 117 sequentially reads data of the storage area of the copy volume group 403 corresponding to the bit set to "ON" in the tape copy bitmap, and stores copies of the read data as backup data. The copy management program 117 also copies the tape copy bitmap referred to in this case in the same tape group 142 as that of the backup data.

Subsequently executed steps 1411 and 1412 are similar to the steps 1310 and 1311 of FIG. 13.

To back up the data stored in the consistency group 402, one of the full backup acquisition process 1300 and the difference backup acquisition process 1400 may be executed. However, first-generation backup data has to be obtained by the full backup acquisition process 1300.

According to the difference backup acquisition process 1400, a used tape 132 can be saved as only the difference data is backed up. However, to restore the data of the consistency group 402 by using the difference data, backup data of a plurality of generations have to be merged. Thus, time for restoration using the difference data is longer than that for restoration using the full backup data.

Figure 15:
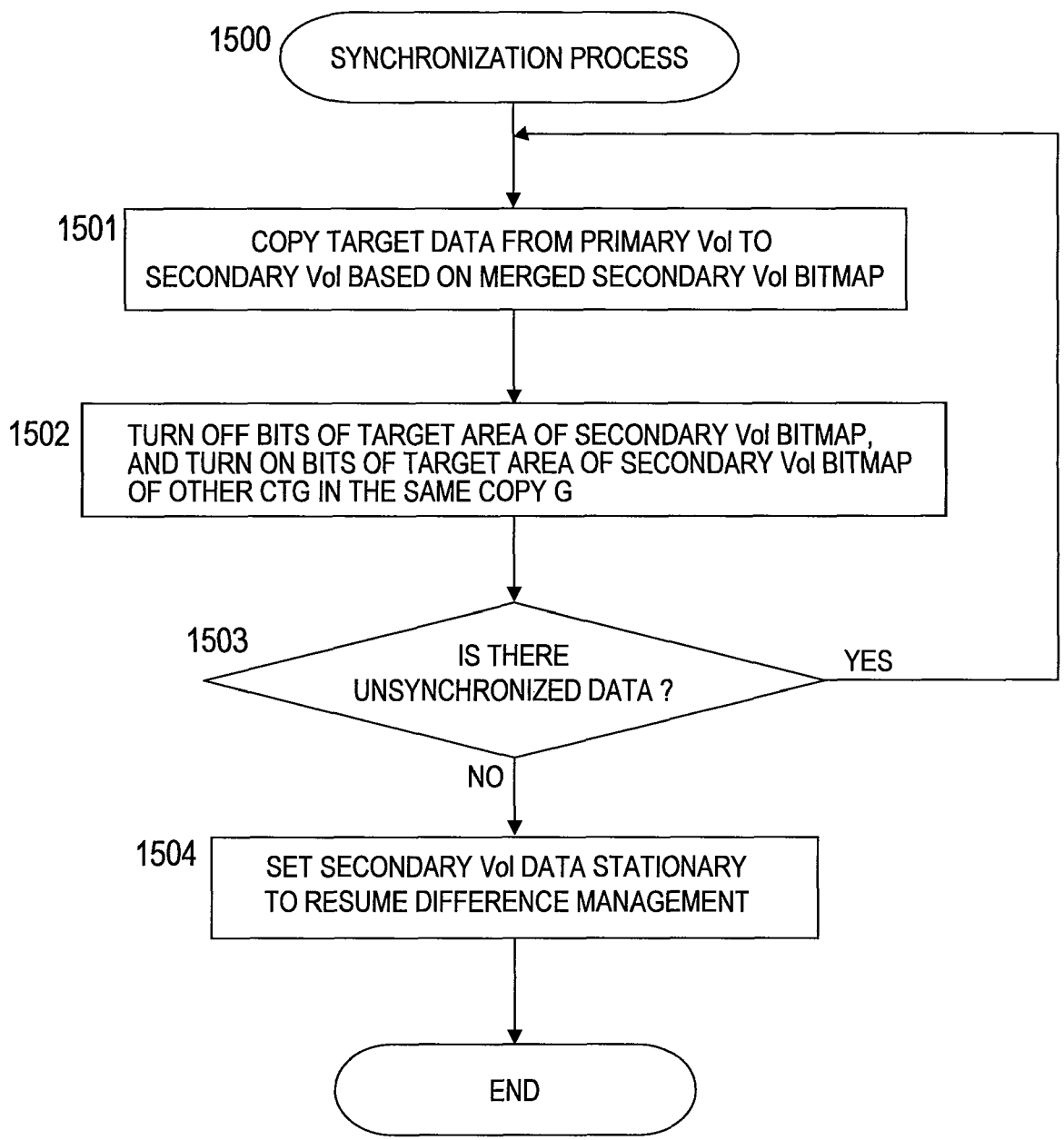
FIG. 15 is a flowchart of a synchronization process executed according to the first embodiment of this invention.

FIG. 15 is a flowchart of a synchronization process 1500 executed according to the first embodiment of this invention.

The synchronization process 1500 is executed in the step 1308 of FIG. 13 and the step 1409 of FIG. 14.

Upon start of the synchronization process 1500, the copy management program 117 copies data stored in the selected consistency group 402 in the copy volume group 403 based on the merged secondary Vol bitmap (step 1501). Specifically, the copy management program 117 refers to the merged secondary Vol bitmap to read data stored in the storage area corresponding to the bit set to "ON" from the consistency group 402, and to store a copy of the read data in the copy volume group 403.

The copy management program 117 sets the bit of the secondary Vol bitmap corresponding to the storage area finished for copying in the step 1501 to "OFF" (step 1502). In the step 1502, the copy management program 117 sets a bit corresponding to the storage area finished for copying in the step 1501 to "ON" in a bitmap 405 corresponding to a consistency group 402 other than a currently selected consistency group 402 among the bitmaps 405 allocated to the copy volume group 403 which is the copy destination.

According to the embodiment, in the step 1307 of FIG. 13 or the step 1408 of FIG. 14, the primary Vol bitmap is merged with the secondary Vol bitmap. However, in place of merging the bitmaps 405 in such a step, the primary Vol bitmap and the secondary Vol bitmap may both be referred to in the step 1501. In any case, data stored in the storage area of the consistency group 402 corresponding to the bit set to "ON" in at least one of the primary Vol bitmap and the secondary Vol bitmap is copied (step 1501). Then, the bits of the primary Vol bitmap and the secondary Vol bitmap corresponding to the storage area finished for copying are set to "OFF" (step 1502).

The copy management program 117 judges whether data yet to be synchronized is present, in other words, if the merged secondary Vol bitmap still includes an "ON" bit (step 1503).

If it is judged that the merged secondary Vol bitmap still includes an "ON" bit, data yet to be synchronized is present. In other words, data stored in the copy volume group 403 does not match data stored in the selected consistency group 402. In this case, the process returns to the step 1501, and the process of the step 1501 and after is repeatedly executed.

On the other hand, if it is judged that the merged secondary Vol bitmap includes no "ON" bit, the data stored in the copy volume group 403 matches the data stored in the selected consistency group 402. In this case, the copy management program 117 changes a status of the copy pair constituted of the selected consistency group 402 and the copy volume group 403 to "SUSPENDED" to resume the difference management (step 1504). Thereafter, when the host computer 102 makes a writing request in the selected consistency group 402, the controller 110 stores data requested to be written only in the selected consistency group 402. The controller 110 sets the bit of the primary Vol bitmap corresponding to the area in which the data requested to be written has been stored to "ON".

Then, the synchronization process 1500 is finished.

Figure 16:
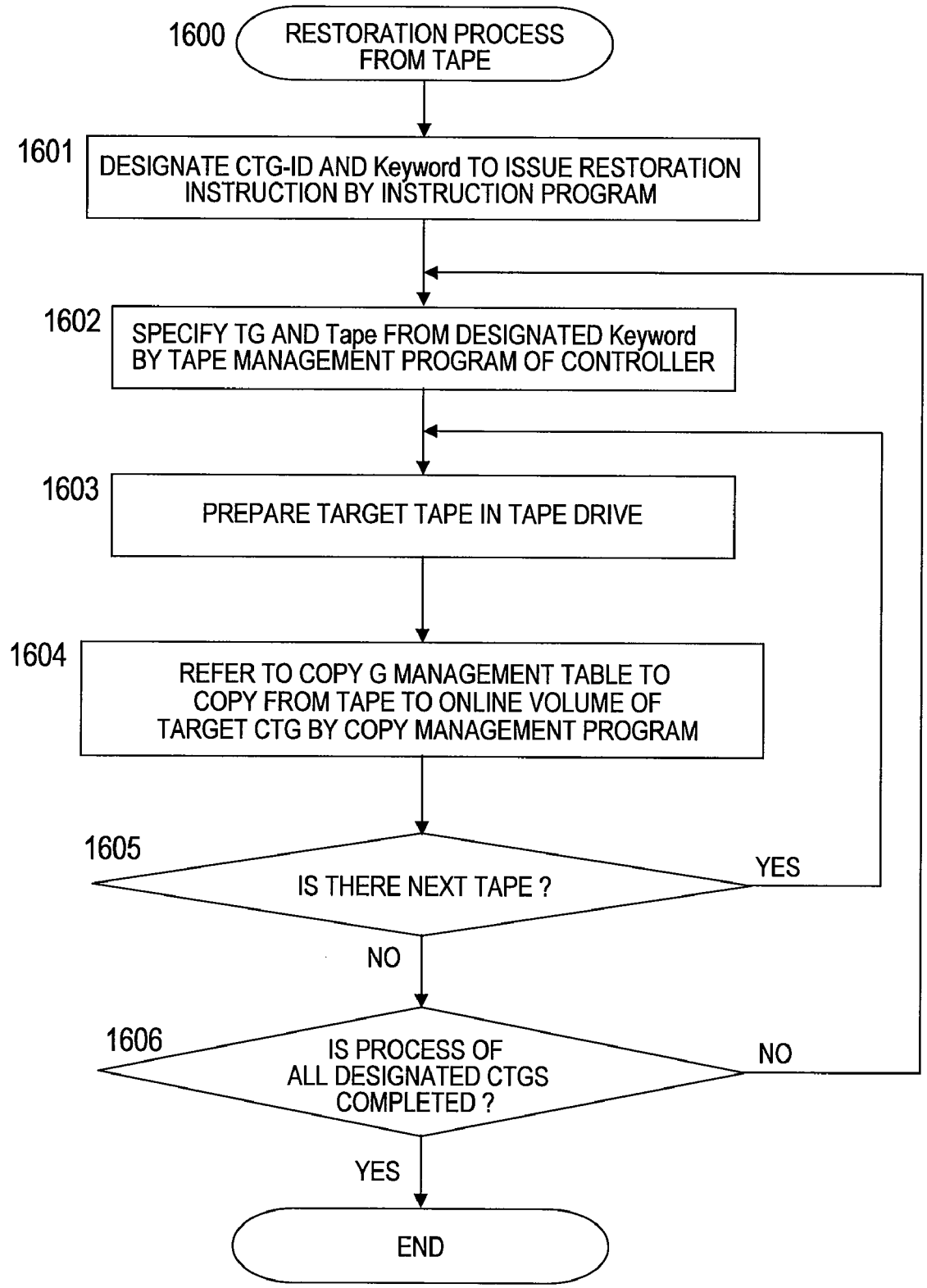
FIG. 16 is a flowchart of a restoration process from a tape executed according to the first embodiment of this invention.

FIG. 16 is a flowchart of a restoration process 1600 from a tape executed according to the first embodiment of this invention.

The restoration process 1600 from the tape is a process for restoring a consistency group 402 by using backup data stored in the tape group 142.

When the instruction program 220 issues a restoration instruction (step 1601), the restoration process 1600 from the tape is started. The restoration instruction contains information for designating an identifier of a consistency group 402 to be restored and a keyword. For example, the user can issue a restoration instruction through the instruction program by designating such an identifier and a keyword. In this case, the user can designate identifiers of a plurality of consistency groups 402 to be restored, and corresponding keywords.

The tape management program 119 of the controller 110 that has received the restoration instruction refers to the tape management table 1191 to specify a tape group 142 and a tape 132 corresponding to the designated keyword (step 1602).

The tape library device 130 loads the specified tape 132 in the tape drive 131 (step 1603).

The copy management program 117 refers to the copy group management table 1173 to copy data stored in the specified tape 132 in a logical volume 140 of a designated consistency group 402 (step 1604). In this case, the copy management program 117 may copy the data stored in the specified tape 132 in a logical volume 140 other than a logical volume 140 in which the data has once been stored.

The copy management program 117 judges whether the specified tape group 142 includes a next tape 132, in other words, whether the specified tape group 142 includes a tape 132 yet to be subjected to copying in the step 1604 (step 1605).

If it is judged that the specified tape group 142 includes a next tape 132, the process returns to the step 1603 to copy data of the next tape 132.

On the other hand, if it is judged that the specified tape group 142 includes no next tape 132, all data of the specified tape group 142 have been copied in the consistency group 402. In this case, the copy management program 117 judges whether restoration of all the designated consistency groups 402 has been completed (step 1606).

If it is judged that restoration of all the designated consistency group 402 has not been completed, the process returns to the step 1602 to execute restoration of the remaining consistency groups 402.

On the other hand, if it is judged that restoration of all the designated consistency groups 402 has been completed, the restoration process 1600 from the tape is finished.

According to the first embodiment, the plurality of primary Vols share one secondary Vol as a copy destination of data. As a result, storage areas allocated to the secondary Vol can be saved. Thus, the D2D2T backup that give no influence on application processing performance can be realized at low costs.

Next, a second embodiment of this invention will be described.

Figure 17:
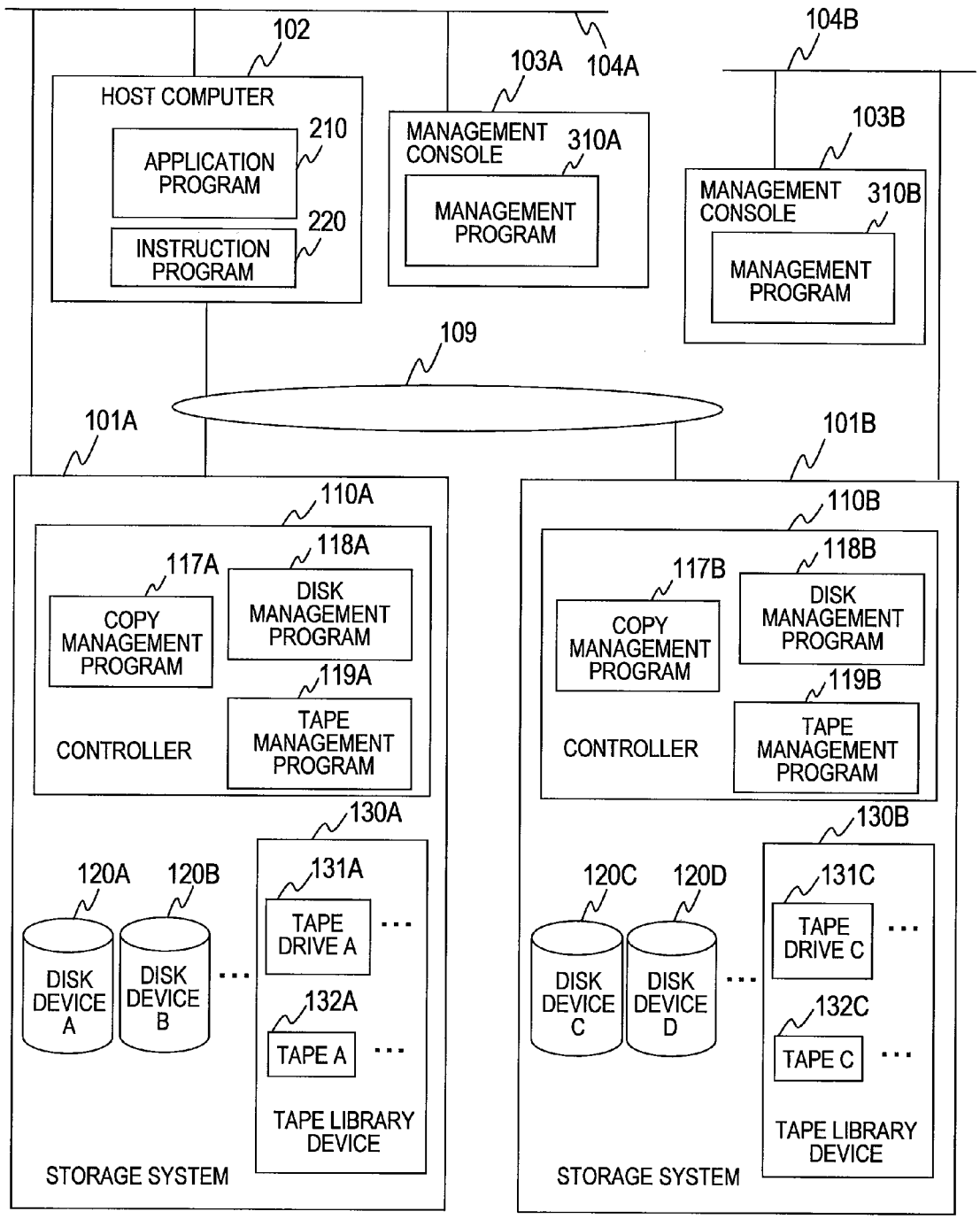
FIG. 17 is a block diagram showing a configuration of a computer system according to a second embodiment of this invention.

FIG. 17 is a block diagram showing a configuration of a computer system according to the second embodiment of this invention.

The computer system of the embodiment includes storage systems 101A and 101B, a host computer 102, and management consoles 103A and 103B.

The storage systems 101A and 101B are similar to the storage system 101 of the first embodiment shown in FIGS. 1 and 2, and thus detailed description thereof will be omitted. In other words, controllers 110A and 110B correspond to the controller 110. Copy management programs 117A and 117B correspond to the copy management program 117. Disk management programs 118A and 118B correspond to the disk management program 118. Tape management programs 119A and 119B correspond to the tape control program 119. The disk devices 120A to 120D correspond to the disk device 120A shown in FIG. 1, or the like. Tape library devices 130A and 130B correspond to the tape library device 130. Tape drives A131A and C131C correspond to the tape drive A131A shown in FIG. 1, or the like. Tapes A132A and C132C correspond to the tape A132A shown in FIG. 1, or the like.

The storage systems 101A and 101B are connected to the host computer 102 via a network 105 as in the case of the first embodiment.

The host computer 102 is similar to the host computer 102 of the first embodiment, and thus description thereof will be omitted.

The management consoles 103A and 103B are similar to the management console 103 of the first embodiment, and thus detailed description thereof will be omitted. Management programs 310A and 310B correspond to the management program 310. However, the management console 103A of this embodiment is connected to the host computer 102 and the storage system 101A via a network 104A. The management console 103B is connected to the storage system 101B via a network 104B.

The networks 104A and 104B are similar to the network 104 of the first embodiment.

As shown in FIG. 17, processes similar to those of the first embodiment can be applied to the computer system which includes a plurality of storage systems 101.

For example, the LUNs 0 to 8 of FIG. 4 may be created in a disk device 120A or the like of the storage system 101A, the LUNs 10 to 14 may be created in a disk device 120C or the like of the storage system 101B, and the TGs 10 to 32 may be created in the tape library 130B or the like of the storage system 101 B. In this case, data copied from the primary Vol to the secondary Vol is transferred from the storage system 101A to the storage system 101B via a network 105.

In this case, BMs 0 to 8 are held by the storage system 101A to be updated by the controller 110A. BMs 10 to 18 and BMs 20 to 28 are held by the storage system 101B to be updated by the controller 110B.

In this case, the controllers 110A and 110B hold the tables of FIGS. 6 to 11. The controller 110A may not hold the tape management table of FIG. 11 among FIGS. 6 to 11. Among the processes shown in FIGS. 12 to 16, the process executed by the copy management program 117 of the first embodiment is executed by the copy management program 117A and the copy management program 117B in cooperation. The process executed by the disk management program 118 of the first embodiment is executed by the disk management program 118A and the disk management program 118B in cooperation. The process executed by the tape management program 119 of the first embodiment is executed by the tape management program 119B.

Between the copy management program 117A and the copy management program 117B, and between the disk management program 118A and the disk management program 118B, to cooperatively execute the processes, pieces of information necessary for the processes are transferred via a network 109 as occasion demands. This information transfer may be executed via the management console 103.

In the second embodiment, as identification information for identifying a logical volume, identification of each storage system 101 may be used in addition to the LUN used in the first embodiment.

According to the second embodiment of this invention, even when the primary Vol and the secondary Vol are included in the different storage systems 101, storage areas allocated to the secondary Vol can be saved by applying this invention. Thus, D2D2T backup that gives no influence on application processing performance can be realized at low costs.

While the present invention has been described in detail and pictorially in the accompanying drawings, the present invention is not limited to such detail but covers various obvious modifications and equivalent arrangements, which fall within the purview of the appended claims.

What is claimed is:

1. A storage system, comprising:
   one or more disk storage devices;
   a tape storage device including a first tape storage medium and a second tape storage medium for storing data; and
   a controller, wherein the controller is configured to:
   control the one or more disk storage devices and the tape storage device;
   divide a storage area of the one or more disk storage devices for storing data into a plurality of volumes including a first volume, a second volume, and a third volume;
   include a memory location that stores a first bitmap indicating whether or not data stored in a storage region of the first volume is updated, a second bitmap indicating whether or not data stored in a storage region of the second volume is updated, a third bitmap indicating whether or not data stored in a storage region of the third volume corresponding to the first volume is updated, and a fourth bitmap indicating whether or not data stored in a storage region of the third volume corresponding to the second volume is updated;
   set a first copy pair between the first volume and the third volume;
   merge the first bitmap with the third bitmap;
   copy first data stored in the first volume to the third volume based on the merged first bitmap, wherein the first data is indicated by the first bitmap as being updated;
   read the first data from the third volume, and copy the first data to the first tape storage medium of the tape storage device;
   change the first copy pair to a second copy pair between the second volume and the third volume;
   merge the second bitmap with the fourth bitmap;
   copy second data stored in the second volume to the third volume based on the merged second bitmap, wherein the second data is indicated by the second bitmap as being updated; and
   read the second data from the third volume, and copy the second data to the second tape storage medium of the tape storage device.

2. The storage system according to claim 1,
   wherein the controller is further configured to:
   store, when at least one of a bit of the first bitmap corresponding to a storage area of the first volume and a bit of the third bitmap corresponding to the storage area is a value indicating that data has been updated, a copy of data stored in the storage area of the first volume corresponding to the bit in the third volume; and
   store, when at least one of a bit of the second bitmap corresponding to a storage area of the second volume and a bit of the fourth bitmap corresponding to the storage area is a value indicating that data has been updated, a copy of data stored in the storage area of the second volume corresponding to the bit in the third volume.

3. The storage system according to claim 2,
   wherein the controller is further configured to:
   set, upon reception of a data writing request in the first volume, a bit of the first bitmap corresponding to a storage area in which requested data is stored to a value indicating that data has been updated;
   set, when the copy of the data stored in the storage area of the first volume is stored in the third volume, a bit of the first bitmap and a bit of the third bitmap corresponding to the storage area to a value indicating that data has not been updated; and
   set, when the copy of data stored in the storage area of the first volume is stored in the third volume, a bit of the fourth bitmap corresponding to the storage area to a value indicating that data has been updated.

4. The storage system according to claim 2,
   wherein the storage system further holds a fifth bitmap including a copy of the first bitmap, and
   wherein the controller is further configured to:
   read, when a bit of the fifth bitmap is a value indicating that data has been updated, the copy of the data stored in a storage area of the first volume corresponding to the bit from the third volume; and
   store the copy read from the third volume and the fifth bitmap in the first tape storage medium.

5. The storage system according to claim 1, wherein the controller further configured to allocate, when the storage capacity of the first volume is larger than that of the second volume, at least a storage capacity equal to that of the first volume to the third volume.

6. The storage system according to claim 1,
   wherein the plurality of volumes further include a fourth volume and a fifth volume, and
   wherein the controller is further configured to:
   store, when the copy of the data stored in the first volume at a first point of time is stored in the third volume, a copy of data stored in the fourth volume at the first point of time in the fifth volume; and
   read the copy of the data stored in the fourth volume from the fifth volume to store the copy in at least one of the plurality of tape storage media of the tape storage device.

7. A computer system, comprising:
   a first storage system; and
   a second storage system coupled to the first storage system via a network,
   wherein the first storage system includes one or more first disk storage devices, and a first controller, wherein the second storage system includes one or more second disk storage devices, a tape storage device, and a second controller, wherein the tape storage device includes a first tape storage medium and a second tape storage medium for storing data;

wherein the first controller is configured to:

control the one or more first disk storage devices; and divide a storage area of the one or more first disk storage devices for storing data into a plurality of volumes including a first volume and a second volume;

wherein the second controller is configured to:

control the one or more second disk storage devices and the tape storage device;

divide a storage area of the one or more second disk storage devices for storing data into a plurality of volumes including a third volume;

include a memory location that stores a first bitmap indicating whether or not data stored in a storage region of the first volume is updated, a second bitmap indicating whether or not data stored in a storage region of the second volume is updated, a third bitmap indicating whether or not data stored in a storage region of the third volume corresponding to the first volume is updated, and a fourth bitmap indicating whether or not data stored in a storage region of the third volume corresponding to the second volume is updated;

set a first copy pair between the first volume and the third volume;

merge the first bitmap with the third bitmap;

copy first data stored in the first volume to the third volume based on the merged first bitmap, wherein the first data is indicated by the merged first bitmap as being updated;

read the first data from the third volume, and copy the first data to the first tape storage medium of the tape storage device;

change the first copy pair to a second copy pair between the second volume and the third volume;

merge the second bitmap with the fourth bitmap;

copy second data stored in the second volume in the third volume based on the merged second bitmap, wherein the second data is indicated by the second bitmap as being updated; and read the second data from the third volume, and copy the second data to the second tape storage medium of the tape storage device.

8. The computer system according to claim 7, wherein the second controller is further configured to:

store, when at least one of a bit of the first bitmap corresponding to a storage area of the first volume and a bit of the third bitmap corresponding to the storage area is a value indicating that data has been updated, a copy of data stored in the storage area of the first volume corresponding to the bit in the third volume; and store, when at least one of a bit of the second bitmap corresponding to a storage area of the second volume and a bit of the fourth bitmap corresponding to the storage area is a value indicating that data has been updated, a copy of data stored in the storage area of the second volume corresponding to the bit in the third volume.

9. The computer system according to claim 8, wherein the first controller is further configured to:

set, upon reception of a data writing request in the first volume, a bit of the first bitmap corresponding to a storage area in which requested data is stored to a value indicating that data has been updated; and set, when the copy of the data stored in the storage area of the first volume is stored in the third volume, a bit of the first bitmap corresponding to the storage area to a value indicating that data has not been updated, and wherein the second controller is further configured to:

set, when the copy of the data stored in the storage area of the first volume is stored in the third volume, a bit of the third bitmap corresponding to the storage area to a value indicating that data has not been updated; and set, when the copy of data stored in the storage area of the first volume is stored in the third volume, a bit of the fourth bitmap corresponding to the storage area to a value indicating that data has been updated.

10. The computer system according to claim 8, wherein the second storage system further holds a fifth bitmap including a copy of the first bitmap; and wherein the second controller is further configured to:

read, when a bit of the fifth bitmap is a value indicating that data has been updated, the copy of the data stored in the storage area of the first volume corresponding to the bit from the third volume; and store the copy read from the third volume and the fifth bitmap in the first tape storage medium.

11. The computer system according to claim 7, wherein the second controller allocates, when the storage capacity of the first volume is larger than that of the second volume, at least a storage capacity equal to that of the first volume to the third volume.

12. The computer system according to claim 7, wherein the plurality of volumes of the first storage system further include a fourth volume, wherein the plurality of volumes of the second storage system further include a fifth volume, and wherein the second controller is further configured to:

store, when the copy of the data stored in the first volume at a first point of time is stored in the third volume, a copy of data stored in the fourth volume at the first point of time in the fifth volume; and read the copy of the data stored in the fourth volume from the fifth volume to store the copy in at least one of the plurality of tape storage media of the tape storage device.

13. A method of controlling a storage system comprising one or more disk storage devices, a tape storage device, and a controller, the tape storage device including a first tape storage medium and a second tape storage medium for storing data, the method comprising the steps of:

controlling the one or more disk storage devices and the tape storage device;

dividing a storage area of the one or more disk storage devices for storing data into a plurality of volumes including a first volume, a second volume, and a third volume;

including a memory location that stores a first bitmap indicating whether or not data stored in a storage region of the first volume is updated, a second bitmap indicating whether or not data stored in a storage region of the second volume is updated, a third bitmap indicating whether or not data stored in a storage region of the third volume corresponding to the first volume is updated, and a fourth bitmap indicating whether or not data stored in a storage region of the third volume corresponding to the second volume is updated;

setting a first copy pair between the first volume and the third volume;

merging the first bitmap with the third bitmap;

copying first data stored in the first volume to the third volume based on the merged first bitmap, wherein the first data is indicated by the first bitmap as being updated;

reading the first data from the third volume, and copying the first data to the first tape storage medium of the tape storage device;

changing the first copy pair to a second copy pair between the second volume and the third volume;

merging the second bitmap with the fourth bitmap;

copying second data stored in the second volume to the third volume based on the merged second bitmap, wherein the second data is indicated by the second bitmap as being updated; and reading the second data from the third volume, and copying the second data to the second tape storage medium of the tape storage device.

14. The method according to claims 13, wherein the step of storing the copy of the data stored in the first volume in the third volume comprises storing, when at least one of a bit of the first bitmap corresponding to the storage area of a first volume and a bit of the third bitmap corresponding to the storage area is a value indicating that data has been updated, a copy of data stored in the storage area of the first volume corresponding to the bit in the third volume, and wherein the step of storing the copy of the data stored in the second volume in the third volume comprises storing, when at least one of a bit of the second bitmap corresponding to a storage area of the second volume and a bit of the fourth bitmap corresponding to the storage area is a value indicating that data has been updated, a copy of data stored in the storage area of the second volume corresponding to the bit in the third volume.

15. The method according to claim 14, further comprising the steps of:

setting, upon reception of a data writing request in the first volume, a bit of the first bitmap corresponding to a storage area in which requested data is stored to a value indicating that data has been updated;

setting, when the copy of the data stored in the storage area of the first volume is stored in the third volume, a bit of the first bitmap and a bit of the third bitmap corresponding to the storage area to a value indicating that data has not been updated; and setting, when the copy of data stored in the storage area of the first volume is stored in the third volume, a bit of the fourth bitmap corresponding to the storage area to a value indicating that data has been updated.

16. The method according to claim 14, wherein the storage system further holds a fifth bitmap including a copy of the first bitmap, and wherein the step of storing the copy of the data stored in the first volume in the first tape storage medium comprises the steps of:

reading, when a bit of the fifth bitmap is a value indicating that data has been updated, the copy of the data stored in the storage area of the first volume corresponding to the bit from the third volume; and storing the copy read from the third volume and the fifth bitmap in the first tape storage medium.

17. The method according to claim 13, further comprising the step of allocating, when the storage capacity of the first volume is larger than that of the second volume, at least a storage capacity equal to that of the first volume to the third volume.

18. The method according to claim 13, wherein the plurality of volumes further include a fourth volume and a fifth volume, and wherein the method further comprises the steps of:

storing, when the copy of the data stored in the first volume at a first point of time is stored in the third volume, a copy of data stored in the fourth volume at the first point of time in the fifth volume; and reading the copy of the data stored in the fourth volume from the fifth volume to store the copy in at least one of the plurality of tape storage media of the tape storage device.

* * * * *